US012228868B2

(12) United States Patent
Takagi

(10) Patent No.: US 12,228,868 B2
(45) Date of Patent: Feb. 18, 2025

(54) TRANSFER DEVICE AND IMAGE FORMING APPARATUS

(71) Applicant: Hiroaki Takagi, Kanagawa (JP)

(72) Inventor: Hiroaki Takagi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/205,582

(22) Filed: Jun. 5, 2023

(65) Prior Publication Data

US 2023/0393495 A1 Dec. 7, 2023

(30) Foreign Application Priority Data

Jun. 6, 2022 (JP) ................................ 2022-091526
Apr. 3, 2023 (JP) ................................ 2023-060073

(51) Int. Cl.
*G03G 15/16* (2006.01)
*G03G 15/00* (2006.01)
*G03G 15/01* (2006.01)

(52) U.S. Cl.
CPC ..... *G03G 15/1615* (2013.01); *G03G 15/0136* (2013.01); *G03G 15/5054* (2013.01); *G03G 15/6585* (2013.01); *G03G 2215/1623* (2013.01)

(58) Field of Classification Search
CPC ........... G03G 15/0136; G03G 15/6585; G03G 15/1615
See application file for complete search history.

(56) References Cited

U.S. PATENT DOCUMENTS 9,367,018 B1 6/2016 Yanagawa et al.
2010/0232819 A1 9/2010 Kudo et al.
(Continued)

FOREIGN PATENT DOCUMENTS

EP 3 220 204 A1 9/2017
EP 3 407 140 A1 11/2018
(Continued)

OTHER PUBLICATIONS

Extended European Search Report issued Oct. 27, 2023 in European Patent Application No. 23177527.1, 8 pages.

*Primary Examiner* — Carla J Therrien
(74) *Attorney, Agent, or Firm* — XSENSUS LLP

(57) ABSTRACT

A transfer device includes an intermediate transferor and primary transfer sections. The primary transfer sections each includes a primary transferor. The primary transfer sections include a most-upstream primary transfer section and a most-downstream primary transfer section. One of the primary transfer sections is a special-color primary transfer section switchable between the most-upstream primary transfer section and the most-downstream primary transfer section. The primary transferor of each of the most-upstream primary transfer section and the most-downstream primary transfer section is switchable between a contact position at which the primary transferor contacts the latent image bearer and a separation position at which the primary transferor is separated from the latent image bearer. With only the primary transferor of the special-color primary transfer section at the separation position, the primary transferor of any other primary transfer section than the special-color primary transfer section is arranged at the contact position to transfer an image.

11 Claims, 19 Drawing Sheets

(56) References Cited

U.S. PATENT DOCUMENTS

2010/0239282 A1 9/2010 Ashikawa et al.
2011/0064487 A1* 3/2011 Ichihashi ........... G03G 15/0136 399/302
2011/0110691 A1 5/2011 Hirose et al.
2012/0190489 A1 7/2012 Takagi
2013/0071150 A1 3/2013 Takagi
2015/0240879 A1 8/2015 Takagi et al.
2016/0062300 A1 3/2016 Takagi et al.
2016/0103404 A1* 4/2016 Hasegawa .......... G03G 15/0136 399/313
2016/0223977 A1 8/2016 Yamazaki et al.
2016/0238981 A1 8/2016 Suido et al.
2017/0010576 A1 1/2017 Takagi et al.
2017/0090344 A1* 3/2017 Ohshika ............. G03G 15/0856
2017/0357200 A1 12/2017 Takagi et al.
2018/0024475 A1* 1/2018 Tomine .............. G03G 15/0136 399/55
2018/0074455 A1 3/2018 Takagi
2018/0268269 A1* 9/2018 Sagimori ............. G06K 15/027
2018/0321615 A1* 11/2018 Suzuki ............... G03G 15/0879
2018/0335721 A1* 11/2018 Koike ................ G03G 15/6585
2019/0025735 A1 1/2019 Hasegawa et al.
2019/0079423 A1* 3/2019 Iwaki ................... G03G 15/011
2019/0212668 A1* 7/2019 Koike ................ G03G 15/5087
2019/0227479 A1* 7/2019 Suzuki ............... G03G 21/1647
2019/0286017 A1 9/2019 Nakamoto et al.
2020/0004187 A1 1/2020 Takagi et al.
2020/0174395 A1 6/2020 Takagi
2020/0326648 A1 10/2020 Yasuhiro et al.
2022/0308517 A1 9/2022 Takagi
2023/0042229 A1 2/2023 Nakamura et al.

FOREIGN PATENT DOCUMENTS

JP 2006-030737 2/2006
JP 2010-217704 9/2010
JP 2015-022166 2/2015
JP 2018-194624 12/2018
JP 2023-022732 2/2023

* cited by examiner

TRANSFER DEVICE AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2022-091526, filed on Jun. 6, 2022, and No. 2023-060073, filed on Apr. 3, 2023, in the Japan Patent Office, the entire disclosure of which is hereby incorporated by reference herein.

BACKGROUND

Technical Field

Embodiments of the present disclosure relate to a transfer device and an image forming apparatus.

Related Art

An image forming apparatus that prints a color image typically includes a transfer device for transferring toner of a special color such as a transparent color or a white color in addition to four colors of yellow (Y), magenta (M), cyan (C), and black (K). In such an image forming apparatus, first, toner images of the four colors are transferred to an intermediate transferor at primary transfer sections. Then, a multi-color toner image is secondarily transferred to a recording sheet such as a sheet of paper by a secondary transfer section.

For example, in addition to the four colors of YMCK, a primary transfer section that transfers a toner image of a transparent color is disposed most downstream on an intermediate transfer belt in a rotation direction of the intermediate transfer belt. When the toner image of the transparent color is not formed, a primary transfer roller of the primary transfer section corresponding to the transparent color is separated from a photoconductor, and a toner image forming device of the transparent toner is stopped.

SUMMARY

In an embodiment of the present disclosure, a transfer device includes an intermediate transferor to rotate and multiple primary transfer sections. The multiple primary transfer sections each includes a primary transferor to contact the intermediate transferor and a primary transfer nip between the primary transferor and a latent image bearer with the intermediate transferor interposed between the primary transferor and the latent image bearer. The multiple primary transfer sections includes a most-upstream primary transfer section most upstream among the multiple primary transfer sections in a rotation direction of the intermediate transferor and a most-downstream primary transfer section most downstream among the multiple primary transfer sections in the rotation direction. One of the most-upstream primary transfer section and the most-downstream primary transfer section is a special-color primary transfer section to transfer developer of a special color other than any of yellow, magenta, cyan, and black colors. The special-color primary transfer section is switchable between the most-upstream primary transfer section and the most-downstream primary transfer section. The primary transferor of each of the most-upstream primary transfer section and the most-downstream primary transfer section is switchable between a contact position at which the primary transferor contacts the latent image bearer with the intermediate transferor interposed between the primary transferor and the latent image bearer and a separation position at which the primary transferor is separated from the latent image bearer. With only the primary transferor of the special-color primary transfer section arranged at the separation position, the primary transferor of any other primary transfer section than the special-color primary transfer section is arranged at the contact position to transfer an image.

In another embodiment of the present disclosure, an image forming apparatus includes the transfer device and latent image bearers including the latent image bearer.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 27A is a plan view of the central primary transfer section in which the primary transfer rollers of the central primary transfer section are arranged at contact positions, according to the modification;

FIG. 27B is a plan view of the primary transfer rollers of the central primary transfer section in which the primary transfer rollers are arranged at separation positions, according to the modification;

FIG. 28A is a plan view of the most-downstream primary transfer section in which the primary transfer roller of the most-downstream primary transfer section is arranged at a contact position;

FIG. 28B is a plan view of the most-downstream primary transfer section in which the primary transfer roller of the most-downstream primary transfer section is arranged at a small separation position;

FIG. 28C is a plan view of the most-downstream primary transfer section in which the primary transfer roller of the most-downstream primary transfer section is arranged at a large separation position;

Figure 1:
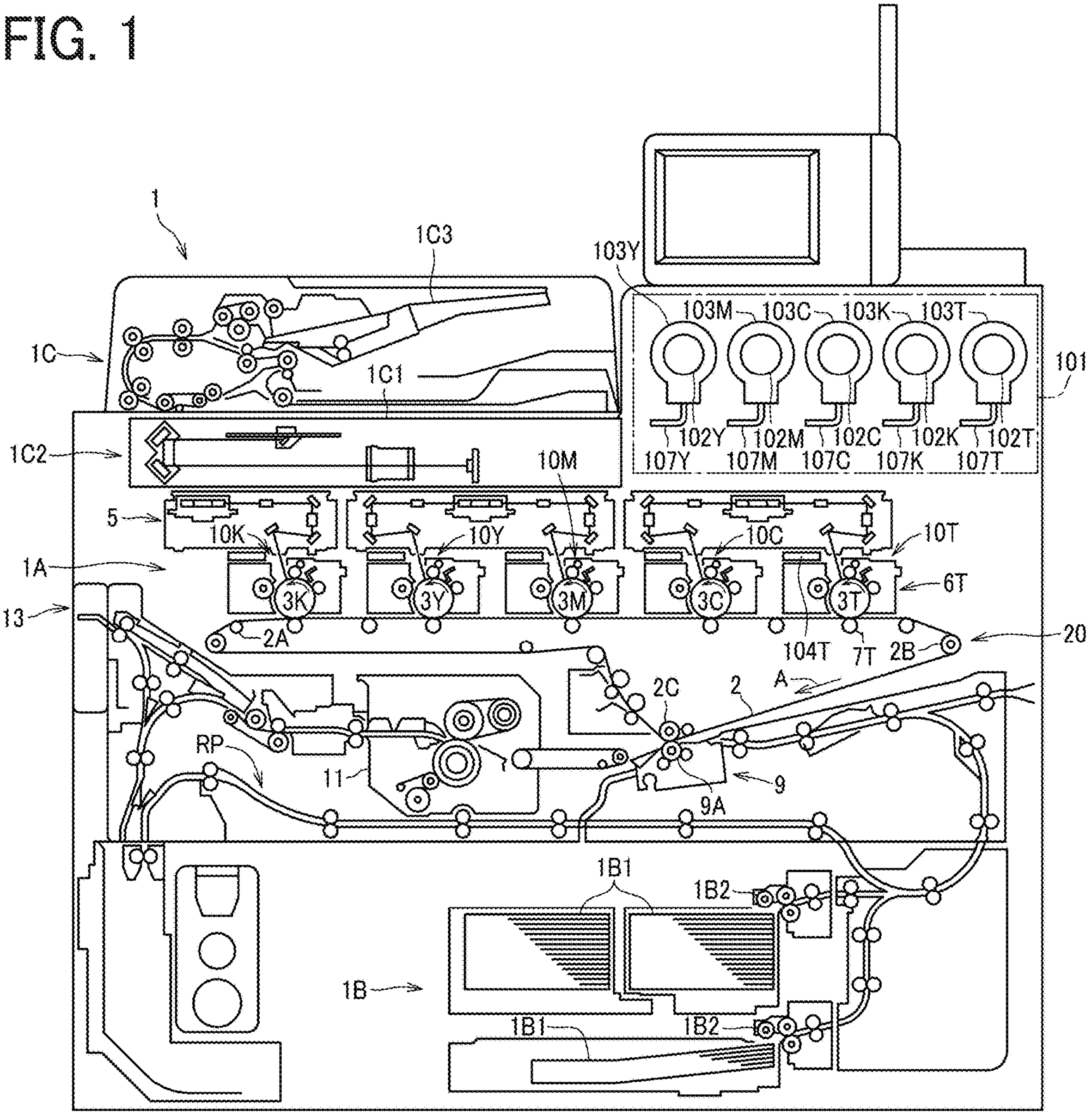
FIG. 1 is a diagram illustrating a configuration of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Embodiments of the present disclosure are described below with reference to the drawings in the following description. Note that like reference numerals are assigned to like or equivalent components and a description of those components may be simplified or omitted.

FIG. 1 is a diagram illustrating a configuration of an image forming apparatus 1 according to an embodiment of the present disclosure. The image forming apparatus 1 illustrated in FIG. 1 is a tandem-type color printer in which multiple photoconductors as latent image bearers are arranged in parallel. Each of the photoconductors provided for the image forming apparatus 1 can form a toner image in a color corresponding to a color separation component of a color image using toner as developer supplied from a developing device. After the toner images formed on the photoconductors are superimposed and transferred to an intermediate transferor, the superimposed images are collectively transferred to a sheet such as a recording sheet. By so doing, a multicolor image can be formed on the sheet. In embodiments of the present disclosure, an image forming apparatus is not limited to a color printer. The image forming apparatus may be, for example, a color copier, a facsimile apparatus, or a printer.

As illustrated in FIG. 1, the image forming apparatus 1 includes an image former 1A in a center portion of the image forming apparatus 1 in the vertical direction, a sheet feeder 1B below the image former 1A, and a document scanner 1C including a document loading table 1C1 above the image former 1A. The image former 1A includes an intermediate transfer belt 2 as an intermediate transferor. The intermediate transfer belt 2 has a stretched surface in a horizontal direction. The image forming apparatus 1 includes components that form images in colors complementary to color separation colors above the intermediate transfer belt 2.

In the image former 1A, image forming devices 10K, 10C, 10M, 10Y, and 10T are arranged. The image forming devices 10K, 10C, 10M, and 10Y can form images with toners of colors of yellow, magenta, cyan, and black, respectively, in a complementary color relation. The image forming device 10T forms a glossy image with transparent toner. In each of the image forming devices 10K, 10C, 10M, 10Y, and 10T, photoconductors 3K, 3C, 3M, 3Y, and 3T, respectively, that can bear images are arranged in parallel along the stretched surface of the intermediate transfer belt 2. The photoconductor 3T bears an image of a transparent toner. In the following description, each of the photoconductors 3K, 3C, 3M, 3Y, and 3T may be simply referred to as a photoconductor 3 in a case in which a similar description applies to all the photoconductors 3K, 3C, 3M, 3Y, and 3T.

Each of the photoconductors 3K, 3C, 3M, 3Y, and 3T is made of a drum rotatable in the same direction, which is a counterclockwise direction in FIG. 1. Around each of the photoconductors 3K, 3C, 3M, 3Y, and 3T, a charger, a writing device, a developing device 6, a primary transfer roller as a primary transfer section, and a cleaner are arranged. Each of the photoconductors 3K, 3C, 3M, 3Y, and 3T, the charger, the writing device, the developing device 6, the primary transfer roller 7, and the cleaner collectively perform image forming processing when the photoconductors 3K, 3C, 3M, 3Y and 3T rotate. For the sake of convenience, the developing device 61, and a primary transfer roller 7T provided for the photoconductor 31 are illustrated with the reference numeral in FIG. 1.

A transfer device 20 includes the intermediate transfer belt 2, primary transfer rollers 7K, 7Y, 7M, 7C, and 7T (see FIG. 2) as primary transferors, and rollers 2A and 2B and a secondary-transfer backup roller 2C. Only the primary transfer roller 7T is illustrated with a reference numeral in FIG. 1 for the sake of convenience.

Toner images formed in the image forming devices 10K, 10C, 10M, 10Y, and 10T including the photoconductors 3K, 3C, 3M, 3Y, and 3T, respectively, are sequentially transferred to the intermediate transfer belt 2. The intermediate transfer belt 2 is stretched around the rollers 2A and 2B, the secondary-transfer backup roller 2C, and multiple rollers that are not denoted with reference numerals in FIG. 1, to rotate in a direction indicated by arrow A in FIG. 1. The intermediate transfer belt 2 faces the photoconductors 3K, 3C, 3M, 3Y, and 3T at multiple positions. The rollers 2A and 2B stretch the intermediate transfer belt 2 at two positions outer than the multiple positions in the direction of rotation of the intermediate transfer belt 2. The secondary-transfer backup roller 2C faces the secondary transfer device 9 with the intermediate transfer belt 2 interposed between the secondary-transfer backup roller 2C and the secondary transfer device 9.

The secondary transfer device 9 includes a secondary transfer roller 9A. The secondary transfer roller 9A forms a secondary transfer nip at a position at which the secondary transfer roller 9A presses against the secondary-transfer backup roller 2C with the intermediate transfer belt 2 interposed between the secondary transfer roller 9A and the secondary-transfer backup roller 2C. A secondary transfer bias having the same polarity as the polarity of toner is applied to the secondary-transfer backup roller 2C. On the other hand, the secondary transfer roller 9A is grounded. Accordingly, a secondary transfer electric field is formed at the secondary transfer nip. The secondary transfer electric field electrostatically moves a multicolor toner image on the intermediate transfer belt 2 from the intermediate transfer belt 2 toward the secondary transfer roller 9A. The secondary transfer device 9 transfers the multicolor toner image onto a sheet, which is conveyed to the secondary transfer nip at the secondary transfer nip.

A recording sheet is fed to the secondary transfer nip from a sheet feeder 1B. The sheet feeder 1B includes multiple sheet feed trays 1B1 and multiple conveyance rollers 1B2. The multiple conveyance rollers 1B2 are disposed on a conveyance path of recording sheets fed from the sheet feed trays 1B1.

The photoconductors 3K, 3C, 3M, 3Y, and 3T are irradiated with writing light by the corresponding one of the writing devices 5, and electrostatic latent images corresponding to image data are formed on the photoconductors 3K, 3C, 3M, 3Y, and 3T. The image data is obtained by scanning a document on the document loading table 1C1 disposed in the document scanner 1C, or by image data output from a computer.

The document scanner 1C includes a scanner 1C2 and an automatic document feeder 1C3. The scanner 1C2 exposes and scans a document on the document loading table 1C1. The automatic document feeder 1C3 is disposed above an upper surface of the document loading table 1C1. The automatic document feeder 1C3 inverts a document fed onto the document loading table 1C1 to scan front and back sides of the document.

Each of the electrostatic latent images on the photoconductors 3K, 3C, 3M, 3Y, and 3T formed by the writing devices 5 is subjected to visual image processing by the corresponding one of the developing devices 6K, 6C, 6M, 6Y and 6T and primarily transferred to the intermediate transfer belt 2. The developing device 6T is illustrated in FIG. 1 for the sake of convenience. After toner imagoes of black, yellow, cyan, magenta, and transparent colors are superimposed and transferred onto the intermediate transfer belt 2, the toner images are secondarily transferred onto a recording sheet collectively by the secondary transfer device 9.

Subsequently, a multicolor image to be fixed borne on the surface of the recording sheet on which the secondary transfer has been performed is fixed by the fixing device 11. The fixing device 11 has a belt fixing structure in which a fixing belt heated by a heating roller and a pressure roller facing and in contact with the fixing belt are disposed. In such a configuration, a contact area, in other words, a nip area is disposed between the fixing belt and the pressure roller, thus allowing an area in which the recording sheet is heated to be increased as compared with a heat-roller fixing structure.

A conveyance direction of the recording sheet that has passed through the fixing device 11 can be switched by a conveyance-path switching claw disposed in a rear portion of the fixing device 11. Specifically, the conveyance direction of the recording sheet is selected between the conveyance path directed to a sheet ejector 13 and a reverse conveyance path RP the conveyance-path switching claw.

In the image forming apparatus 1 having the above-described configuration, electrostatic latent images are formed on the uniformly charged photoconductors 3K, 3C, 3M, 3Y, and 3T by exposure scanning of a document placed on the document loading table 1C1 or by reading image data from a computer. Subsequently, the electrostatic latent images are subjected to visual image processing by the developing devices 6K, 6C, 6M, 6Y, and 6T. Then, the toner images are primarily transferred to the intermediate transfer belt 2.

In the case of a single-color image, a toner image that has been transferred to the intermediate transfer belt 2 is transferred onto a recording sheet fed from the sheet feeder 1B as is. In the case of a multi-color image, primary transfer is repeated such that toner images are superimposed one on another. Then, the toner images are secondarily transferred to the recording sheet collectively. The unfixed image that has been secondarily transferred onto the recording sheet is fixed by the fixing device 11. Then, the recording sheet is fed to the sheet ejector 13 or reversed and fed again to the secondary transfer nip.

In FIG. 1, the intermediate transfer belt 2 is formed of, for example, a single layer or multiple layers of polyvinylidene fluoride (PVDF), ethylene-tetrafluoroethylene copolymer (ETFE), polyimide (PI), or polycarbonate (PC). A conductive material such as carbon black is dispersed in the intermediate transfer belt 10. The intermediate transfer belt 2 is adjusted to have a volume resistivity in a range of $10^8$ to $10^{12}$ Ωcm and a surface resistivity in a range of $10^9$ to $10^{13}$ Ωcm. The surface of the intermediate transfer belt 2 may be coated with a release layer as needed. Examples of the material employed for coating the intermediate transfer belt 2 include fluororesins such as ethylene-tetrafluoroethylene copolymer (ETFE), polytetrafluoroethylene (PTFE), polyvinylidene fluoride (PVDF), perfluoroalkoxy fluororesin (PFA), tetrafluoroethylene-hexafluoropropylene copolymer (FEP), and vinyl fluoride (PVF). However, the materials employed for coating the intermediate transfer belt 2 are not limited to the above-described fluororesins. Examples of a method for producing the intermediate transfer belt 2 include a casting method and a centrifugal molding method. The surface of the intermediate transfer belt 2 may be polished as needed. When the volume resistivity of the intermediate transfer belt 2 exceeds the above-described range, a bias needed to transfer a toner image onto a recording sheet increases. Accordingly, the cost of power source for the intermediate transfer belt 2 is increased. For this reason, such a configuration of the intermediate transfer belt 2 is not preferable. Further, charging potential of the intermediate transfer belt 2 increases in, for example, a transfer process, or a transfer-sheet peeling process. Accordingly, self-discharge of the intermediate transfer belt 2 may be difficult. For this reason, an electric-charge remover is needed. In addition, when the volume-resistivity and the surface-resistivity of the intermediate transfer belt 2 are lower than the above-described ranges, attenuation of the charging potential is fast, which is advantageous for removing electric charges of the intermediate transfer belt 2 due to self-discharge. However, an electric current at the time of transfer flows in a plane direction of the surface of the intermediate transfer belt 2. Accordingly, toner scattering may occur. For this reason, the volume resistivity and the surface resistivity of the intermediate transfer belt 2 according to the present embodiment are preferably set within the ranges described above. Note that, for the measurement of the volume resistivity and the surface resistivity of the intermediate transfer belt 2, a high-resistance resistivity meter (Hiresta-IP, registered trademark, manufactured by Mitsubishi Chemical Corporation) was connected to a high resistance state (HRS) probe having the inner electrode diameter of 5.9 mm and the ring-electrode inner-diameter of 11 mm. A voltage of 100 V with the surface resistivity of 500 V was applied to the front and back surfaces of the intermediate transfer belt 2 and a measured value after 10 seconds from a time at which the voltage of 100 V and the surface resistivity of 500 V was applied, was employed.

The intermediate transfer belt 2 is stretched around at least the roller 2A and the roller 2B as a roller pair and the secondary-transfer backup roller 2C disposed at the secondary transfer nip. The roller 2A as a driving roller is set to rotate clockwise such that the intermediate transfer belt 2 moves in the direction indicated by arrow A illustrated inside the intermediate transfer belt 2 in FIG. 1. The surface of the intermediate transfer belt 2, on which the toner images are transferred, moving between the roller 2A and the roller 2B faces the photoconductors 3K, 3Y, 3C, 3M, and 3T of the image forming devices 10K, 10C, 10M, 10Y, and 10T. The primary transfer rollers 7K, 7Y, 7M, 7C, and 7T serve as transferors for electrostatically transferring visible images on the respective photoconductors 3 to the intermediate transfer belt 2. The primary transfer rollers 7K, 7Y, 7M, 7C, and 7T are disposed at positions at which the primary transfer rollers 7K, 7Y, 7M, 7C, and 7T face the photoconductors 3K, 3C, 3M, 3Y, and 3T, respectively, via the intermediate transfer belt 2. The primary transfer roller 7T is illustrated in FIG. 1 for the sake of convenience.

The primary transfer rollers 7K, 7Y, 7M, 7C, and 7T according to the present embodiment are cored bars made of metal such as iron, steel use stainless (SUS), or aluminum (Al) coated with foam resin. The foam resin has a wall thickness of 2 mm to 10 mm. Note that known blade-shaped or brush-shaped transferors can also be employed as the transferors.

In the present embodiment, white toner is employed for the purpose of forming a white base color for an image in addition to toner employed for full-color image formation. In addition, transparent toner may be employed for the purpose of improving glossiness and transferability of an image, and, for example, light cyan toner, or light magenta toner may be selected for increasing a color gamut. For the purpose of creating a colored metal color such as a red copper color and a bronze color, toner of a metal color such as gold toner and silver toner may also be employed as a base.

Figure 2:
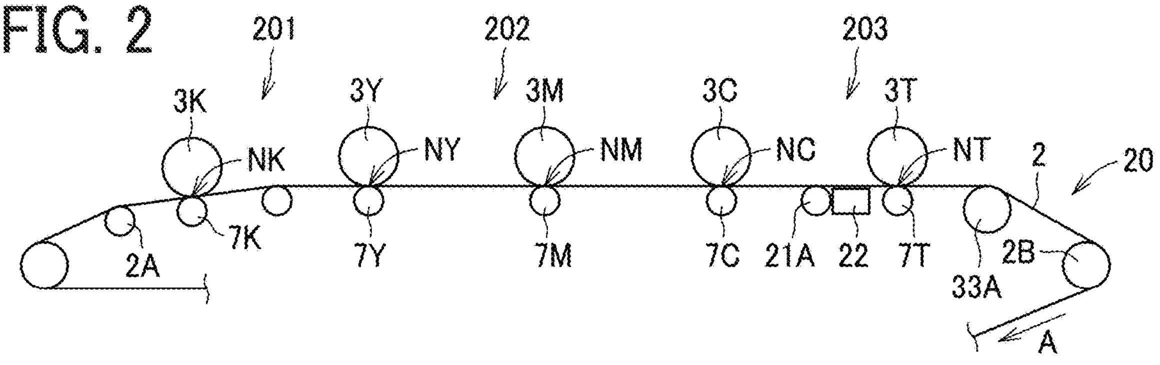
FIG. 2 is a schematic diagram illustrating a configuration of a transfer device according to an embodiment of the present disclosure.
Figure 3A:
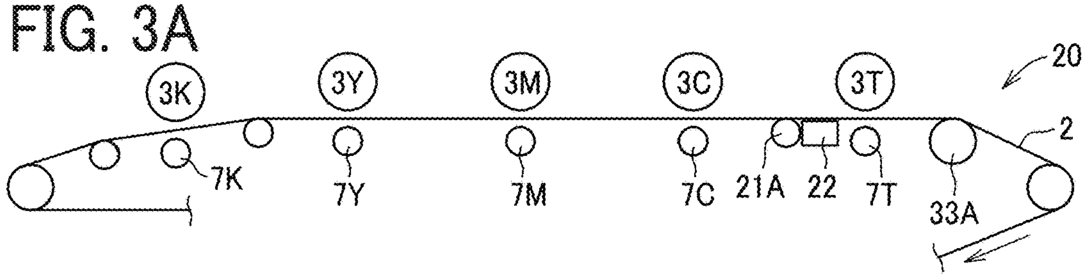
FIGS. 3A, 3B, 3C, 3D, 3E, and 3F are diagrams illustrating the transfer device of FIG. 2 that operates in modes A, B, C, D, E and F, respectively, according to an embodiment of the present disclosure.
Figure 3B:
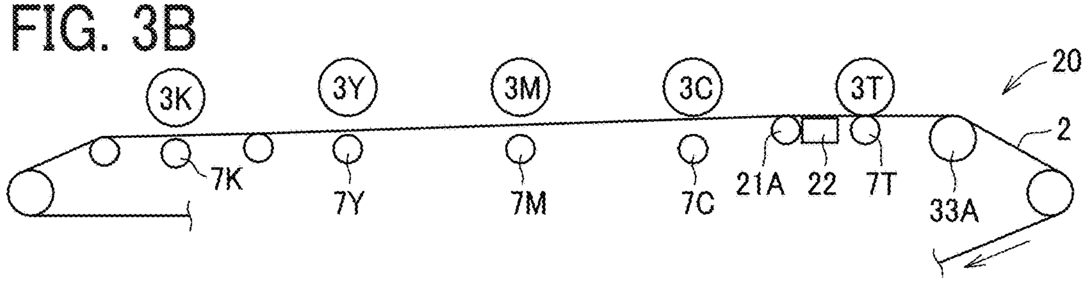
Figure 3C:
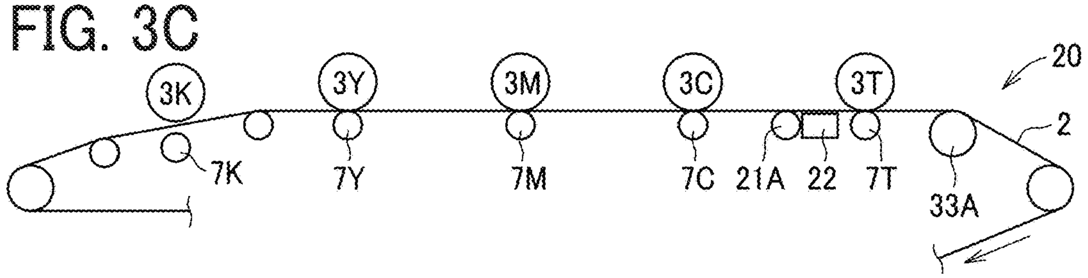
Figure 3D:
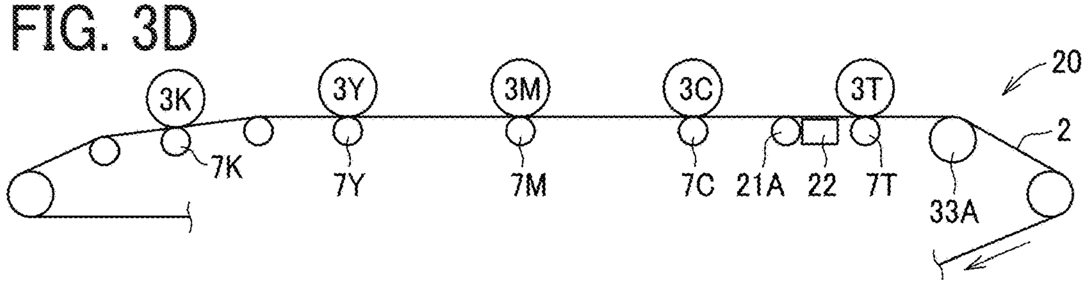
Figure 3E:
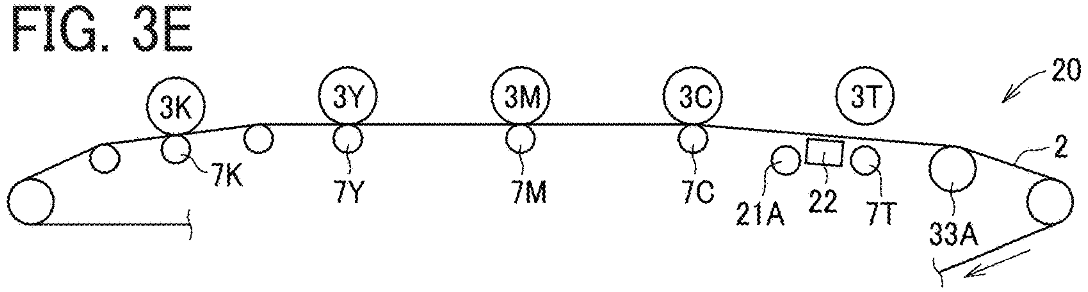
Figure 3F:
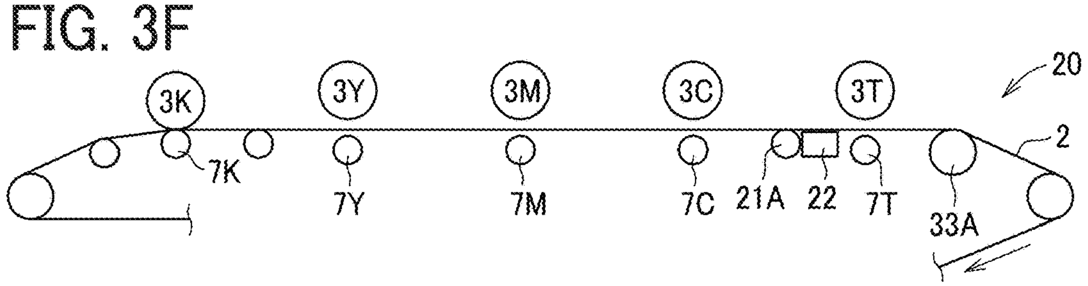

As illustrated in FIG. 2, the primary transfer roller 7T and the photoconductor 3T form a special color transfer nip NT with the intermediate transfer belt 2 interposed between the primary transfer roller 7T and the photoconductor 3T. The primary transfer roller 7C and the photoconductor 3C form a cyan transfer nip NC with the intermediate transfer belt 2 interposed between the primary transfer roller 7C and the photoconductor 3C. The primary transfer roller 7M and the photoconductor 3M form a magenta transfer nip NM with the intermediate transfer belt 2 interposed between the primary transfer roller 7M and the photoconductor 3M. The primary transfer roller 7Y and the photoconductor 3Y form a yellow transfer nip NY with the intermediate transfer belt 2 interposed between the primary transfer roller 7Y and the photoconductor 3Y. The primary transfer roller 7K and a photoconductor 3K form a black transfer nip NM with the intermediate transfer belt 2 interposed between the primary transfer roller 7K and the photoconductor 3K.

The transfer device 20 includes a most-upstream primary transfer section 201 disposed most upstream in the rotation direction of the intermediate transfer belt 2, a most-downstream primary transfer section 203 disposed most downstream in the rotation direction of the intermediate transfer belt 2, and a central primary transfer section 202 including the primary transfer rollers 7Y, 7M, and 7C disposed between the most-upstream primary transfer section 201 and the most-downstream primary transfer section 203. In the present embodiment, the most-upstream primary transfer section 201 transfers a black toner image at a black transfer nip NK, the central primary transfer section 202 transfers a cyan toner image at a cyan transfer nip NC, a magenta toner image at a magenta transfer nip NM, and a yellow toner image at a yellow transfer nip NY to the intermediate transfer belt 2. The most-downstream primary transfer section 203 transfers a special color toner image at a special color transfer nip NT to the intermediate transfer belt 2. Furthermore, in the following description, upstream or downstream in the rotation direction of the intermediate transfer belt 2 may be also referred to simply as upstream or downstream. The above-described special color is a color other than yellow; magenta, cyan, and black, and is, for example, clear color, white, gold, or silver.

In FIG. 2, the primary transfer roller 7K disposed in the most-upstream primary transfer section 201 is a most-upstream primary transferor, the primary transfer rollers 7Y, 7M, and 7C disposed in the central primary transfer section 202 are central primary transferors, and the primary transfer roller 7T disposed in the most-downstream primary transfer section 203 is a most-downstream primary transferor. The rotation direction of the intermediate transfer belt 2 is a direction indicated by arrow A in FIG. 2. The primary transfer rollers 7K, 7Y, 7M, and 7C upstream from the primary transfer roller 7T in the rotation direction of the intermediate transfer belt 2 are also upstream primary transferors.

In the present embodiment, a toner image of the special color can be transferred to the intermediate transfer belt 2 in both the most-upstream primary transfer section 201 and the most-downstream primary transfer section 203. Accordingly, a toner image of the special color can be transferred in a desired order. Details are described below.

Between the primary transfer roller 7C and the primary transfer roller 7T in the rotation direction of the intermediate transfer belt 2, a driven roller 21A as a second tension roller and a sensor 22 as a sensor are disposed. The driven roller 21A stretches the intermediate transfer belt 2. The sensor 22 detects a scale on the intermediate transfer belt 2 and detects the rotation speed of the intermediate transfer belt 2. Controlling the rotation speed of the intermediate transfer belt 2 based on the detection result of the sensor 22 prevents positional shift of toner images of the colors to be transferred to the intermediate transfer belt 2.

In the transfer device 20 according to the present embodiment, the primary transfer rollers 7K, 7Y, 7M, 7C, and 7T contact with and separate from the photoconductors 3K, 3Y, 3M, 3C, and 3T, respectively, with the intermediate transfer belt 2 interposed between the primary transfer rollers 7K, 7Y 7M, 7C, and 7T and the photoconductors 3K, 3Y, 3M, 3C, and 3T, respectively, in accordance with modes of image formation. Specifically, as described in modes A, B, C, D, E, and F in Table 1 below, the position of each of the primary transfer rollers 7K, 7Y, 7M, 7C, and 7T can be changed between a contact position and a separation position. The contact position is a position at which each of the primary transfer rollers 7K, 7Y, 7M, 7C, and 7T contacts the corresponding one of the photoconductors 3K, 3Y, 3M, 3C, and 3T, via the intermediate transfer belt 2 to form a primary transfer nip. The separation position is a position at which each of the primary transfer rollers 7K, 7Y, 7M, 7C, and 7T is separated from the corresponding one of the photoconductors 3K, 3Y, 3M, 3C, and 3T. In addition, the driven roller 21A around which the intermediate transfer belt 2 is stretched and the driven roller 33A that serves as a first tension roller also move in a direction away from the photoconductor 3T in conjunction with the primary transfer roller 7T of the most-downstream primary transfer section 203, in other words, in a downward direction in FIG. 2 or in an upward direction opposite to the downward direction. The position of the primary transfer roller 7T of the most-downstream primary transfer section 203 can be changed among the following positions: the contact position at which the primary transfer roller 7T contacts the photoconductor 3T to form the primary transfer nip NT, a small separation position at which the primary transfer roller 7T is separated from the photoconductor 3T by a small separation distance, and a large separation position at which the primary transfer roller 7T is separated from the photoconductor 3T by a large separation distance. In conjunction with the primary transfer roller 7T, the driven rollers 21A and 33A also move in the upward direction in FIG. 2, which is a direction in which the driven rollers 21A and 33A approach the photoconductor 3T or in the downward direction in FIG. 2, which is a direction in which the driven rollers 21A and 33A move away from the photoconductor 3T. Note that FIG. 2 illustrates a case of the mode D in which all the primary transfer rollers 7K, 7Y, 7M, 7C, and 7T contact with the intermediate transfer belt 2.

TABLE 1

| | A | B | C | D | E | F |
|---|---|---|---|---|---|---|
| Most-downstream primary transfer | Small separation position | Contact position | Contact position | Contact position | Large separation position | Small separation position |

TABLE 1-continued

| | A | B | C | D | E | F |
|---|---|---|---|---|---|---|
| section + Driven roller | | | | | | |
| Central primary transfer section | Separation position | Separation position | Contact position | Contact position | Contact position | Separation position |
| Most-upstream primary transfer Section | Separation position | Separation position | Separation position | Contact position | Contact position | Contact position |

FIGS. 3A, 3B, 3C, 3D, 3E, and 3F are diagrams illustrating the transfer device 20 that operates in the above-described modes A, B, C, D, E and F, respectively. At the separation position in each of the modes A, B, C, D, E and F, the primary transfer rollers 7K, 7Y, 7M, 7C, and 7T are moved downward in each of FIGS. 3A, 3B, 3C, 3D, 3E, and 3F, such that the primary transfer rollers 7K, 7Y, 7M, 7C, and 7T are separated from the photoconductors 3K, 3Y, 3M, 3C, and 3T, respectively. Accordingly, the positions at which the intermediate transfer belt 2 is stretched by the primary transfer rollers 7K, 7Y 7M, 7C, and 7T change. In addition, the driven rollers 21A and 33A move downward in FIGS. 3A, 3B, 3C, 3D, 3E, and 3F in conjunction with movement of the primary transfer roller 7T of the most-downstream primary transfer section 203 in which the primary transfer roller 7T moves away from the photoconductor 3T. The driven rollers 21A and 33A move upward in FIGS. 3A, 3B, 3C, 3D, 3E, and 3F in conjunction with the movement of the primary transfer roller 7T in which the primary transfer roller 7T approaches the photoconductor 3T. The sensor 22 moves downward in FIGS. 3A, 3B, 3C, 3D, 3E, and 3F in accordance with the movement of the primary transfer roller 7T from the contact position or the large separation position to the small separation position. Movements of, for example, the primary transfer rollers 7K, 7Y, 7M, 7C, and 7T in the above-described A, B, C, D, E and F are described below Further, the position of the driven roller 33E indicated as the contact position in Table 1 is a first position, the position of the driven roller 33A indicated as the small separation position is a second position, and the position of the driven roller 33A indicated as the large separation position is a third position. Note that each of the primary transfer rollers 7K, 7Y, 7M, 7C, and 7T does not strictly move upward or downward in FIGS. 3A, 3B, 3C, 3D, 3E, and 3F.

Figure 4:
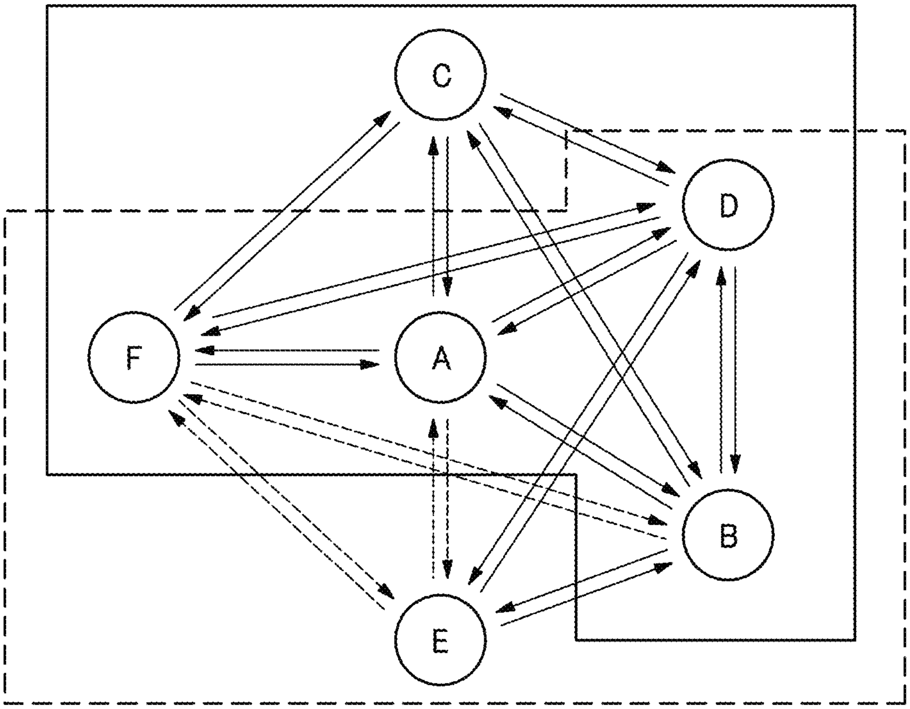
FIG. 4 is a diagram illustrating how each of the modes A, B, C, D, E and F is switched between each other, according to an embodiment of the present disclosure.

FIG. 4 is a diagram illustrating how the modes A, B, C, D, E and F are switched, according to an embodiment of the present disclosure. An area surrounded by a solid line in FIG. 4 illustrates a case in which the modes A, B, C, D, and F are switched when the black (K) toner is arranged in the most-downstream primary transfer section 203. An area surrounded by a dotted line in FIG. 4 illustrates a case in which the modes A, B, D, and F are switched when the special color toner is arranged in the most-downstream primary transfer section 203. In other words, the mode C is a mode employed only when the black (K) toner is arranged in the most-downstream primary transfer section 203, the mode E is a mode employed When the special color toner is arranged in the most-downstream primary transfer section 203 and switching between the mode C and the mode E is not performed.

Switching between the modes A, B, C, D, F, and F as described above allows only the primary transfer sections to form the primary transfer nips needed for image formation. Accordingly, the primary transfer nips are not formed by the primary transfer sections that are not needed for image formation. Thus, excessive toner consumption can be prevented. For example, in the case in which a monochrome image is formed on a recording sheet, in the mode F, the black transfer nip NK is formed only in the most-upstream primary transfer section 201. In particular, in the transfer device 20 according to the present embodiment in which the special color toner is transferred in the most-upstream primary transfer section 201 and the most-downstream primary transfer section 203, the primary transfer roller 7K of the most-upstream primary transfer section 201 and the primary transfer roller 7T of the most-downstream primary transfer section 203 are contactable to and separable from the photoconductors 3K and 3T, respectively. By so doing, the primary transfer roller 7K of the most-upstream primary transfer section 201 or the primary transfer roller 7T of the most-downstream primary transfer section 203 can be separated from the photoconductor 3K or 3T, respectively, as needed even when the special color toner is transferred either in the most-upstream primary transfer section 201 or the most-downstream primary transfer section 203. Accordingly, excessive consumption of the special color toner can be prevented in any of the modes A, B, C, D, E, and F.

When the primary transfer rollers 7Y, 7M, and 7C of the central primary transfer section 202 are arranged at the contact positions and the primary transfer roller 7T of the most-downstream primary transfer section 203 is arranged at the separation position, as indicated in the mode E, the primary transfer roller 7T is arranged at the large separation position. Thus, the driven roller 33A around which the intermediate transfer belt 2 is stretched is largely moved in the direction away from the photoconductor 3T. As a result, the position at which the intermediate transfer belt 2 is stretched can be changed to a position away from the photoconductor 3T. Such a configuration can prevent interference between the photoconductor 3T and the intermediate transfer belt 2 and damage to the photoconductor 3T and the intermediate transfer belt 2 due to the interference.

In some switching operations among the switching operations between the modes A, B, C, D, E, and F, the order of components that contact with or separate from the intermediate transfer belt 2 is preset. Specifically, in the case in which the mode A is switched to the mode E, the primary transfer roller 7T and the driven rollers 21A and 33A are moved first to the large separation positions. Then, the primary transfer rollers 7T, 7M, and 7C of the central primary transfer section 202 are moved to the contact positions.

By contrast, in the case in which the mode E is switched to the mode A, the primary transfer rollers 7Y, 7M, and 7C of the central primary transfer section 202 are moved first to the separation positions. Then, the primary transfer roller 7T and the driven rollers 21A and 33A are moved to the small separation positions.

In the above-described cases, the position of the primary transfer roller 7K of the most-upstream primary transfer section 201 is switched between the separation position and the contact position at any suitable time. In the case in which the mode B is switched to the mode F, the primary transfer roller 7T and the driven rollers 21A and 33A are moved first to the small separation position. Then, the primary transfer roller 7K of the most-upstream primary transfer section 201 is moved to the contact position.

By contrast, in the case in which the mode F is switched to the mode B, the primary transfer roller 7K of the most-upstream primary transfer section 201 is moved first to the separation position. Then, the primary transfer roller 7T and the driven rollers 21A and 33A are moved to the contact position. In the case in which the mode E is switched to the mode F, the primary transfer rollers 7Y, 7M, and 7C of the central primary transfer section 202 are moved first to the separation position. Then, the primary transfer roller 7T and the driven rollers 21A and 33A are moved to the small separation position.

By contrast, in the case in which the mode F is switched to the mode E, the primary transfer roller 7T and the driven rollers 21A and 33A are moved first to the large separation position. Then, the primary transfer rollers 7Y, 7M, and 7C of the central primary transfer section 202 are moved to the contact position. As described above, the primary transfer roller 7T and the driven rollers 21A and 33A that are moved to the separation position are moved first. Accordingly, damage to the intermediate transfer belt 2 and the photoconductors 3K, 3C, 3M, 3Y, and 3T due to the contact of the intermediate transfer belt 2 and the photoconductors 3K, 3C, 3M, 3Y, and 3T can be prevented.

In the present embodiment, as described below, the primary transfer roller 7T and the driven rollers 21A and 33A are simultaneously moved by a common moving mechanism. In some embodiments, when the primary transfer roller 7T and the driven rollers 21A and 33A are moved by a different moving mechanism, the order in which the primary transfer roller 7T and the driven rollers 21A and 33A are moved may be any desired order.

Figure 5:
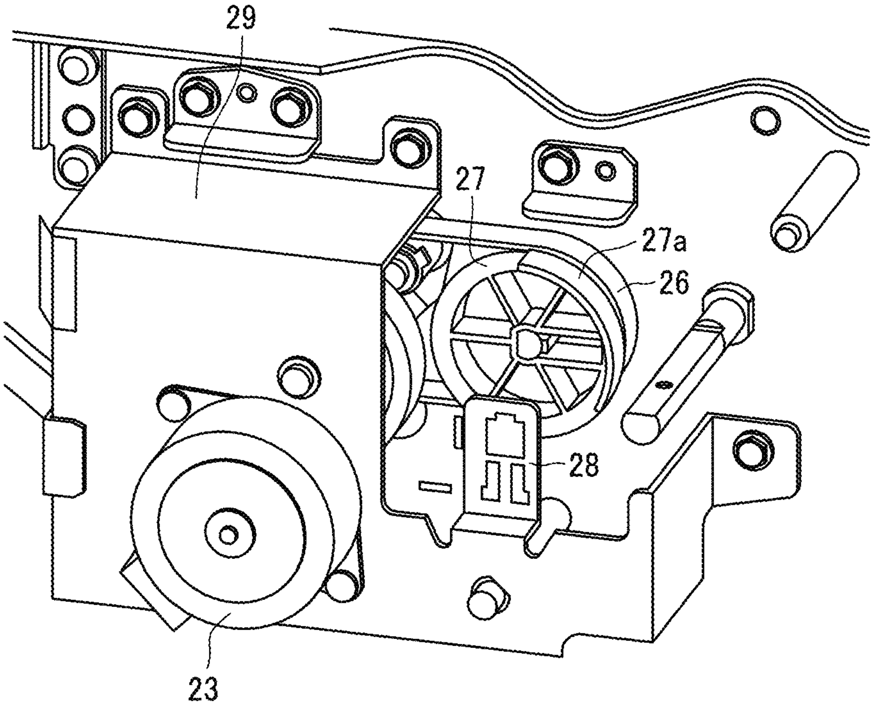
FIG. 5 is a perspective view of a driving source of a contact-and-separation mechanism as viewed from the front side of the image forming apparatus of FIG. 1, in which a primary transfer roller is arranged at a small separation position, according to an embodiment of the present disclosure.
Figure 6:
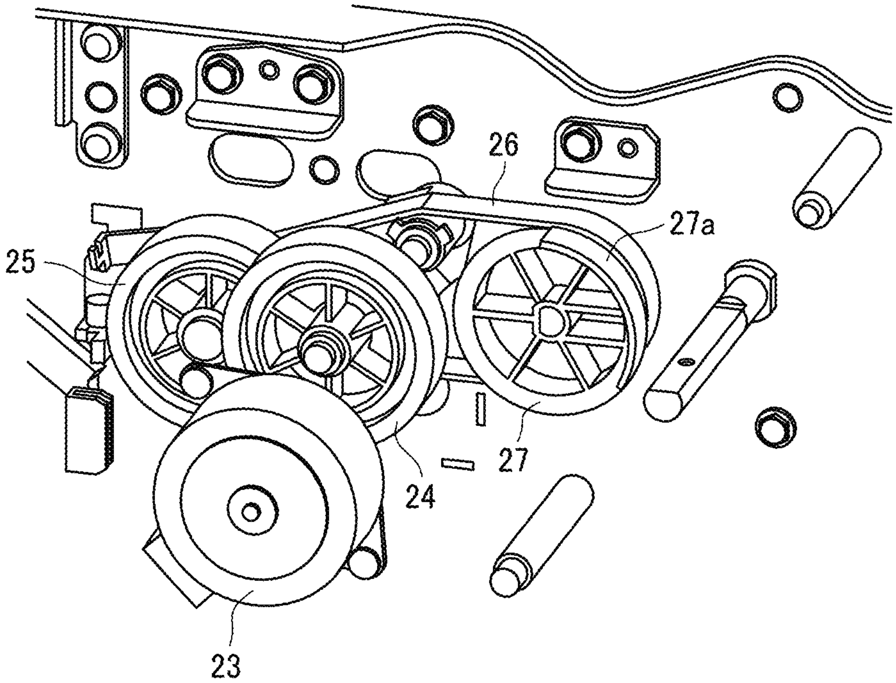
FIG. 6 is a perspective view of the driving source of the contact-and-separation mechanism of FIG. 5, in which a bracket covering a gear train is removed, according to an embodiment of the present disclosure.

Next, a first contact-and-separation mechanism as a first movement mechanism that causes the primary transfer roller 7T disposed in the most-downstream primary transfer section 203 to contact with and separate from the intermediate transfer belt 2 is described below First, a motor that is a driving source of the first contact-and-separation mechanism and components surrounding the motor are described with reference to FIGS. 5 and 6. FIG. 5 is a perspective view of a motor 23 and components surrounding the motor 23, according to the present embodiment. FIG. 6 is a perspective view of the motor 23 and the components surrounding the motor 23 in which a bracket 29 covering a gear train is removed, according to the present embodiment.

As illustrated in FIGS. 5 and 6, the motor 23 that is a stepping motor is connected to a two-stage gear 24. The two-stage gear 24 meshes with the motor 23 on teeth of one stage of the two-stage gear 24, and the two-stage gear 24 rotates by the output of the motor 23. Teeth of the other stage of the two-stage gear 24 mesh with teeth disposed on the shaft of a pulley 25 to transmit a driving force from the motor 23 to the pulley 25. A toothed belt 26 is wound around the pulley 25 and a feeler-equipped pulley 27. Teeth on an inner peripheral surface of the toothed belt 26 mesh with teeth on an outer peripheral surface of each of the pulley 25 and the feeler-equipped pulley 27.

The driving force of the motor 23 rotates a cam, to be described below, to cause the primary transfer roller 7T (see FIGS. 28A, 28B and 28C) to contact with or separate from the intermediate transfer belt 2. The driving force of the motor 23 is also transmitted to the feeler-equipped pulley 27 via the two-stage gear 24, the pulley 25, and the toothed belt 26 to rotate the feeler-equipped pulley 27.

A photosensor 28 (see FIG. 7) is disposed to face the feeler-equipped pulley 27. Rotation of the feeler-equipped pulley 27 changes whether a feeler 27*a* provided for the feeler-equipped pulley 27 is arranged at a position facing the photosensor 28. Thus, the feeler-equipped pulley 27 can change a condition in which the photosensor 28 detects. The photosensor 28 is attached to the bracket 29.

Figure 7:
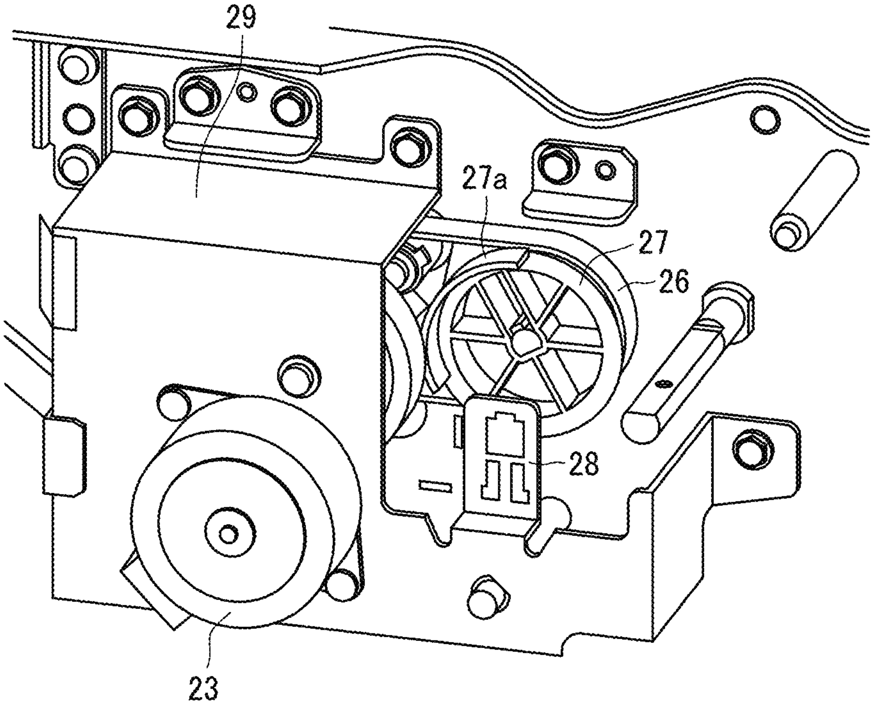
FIG. 7 is a perspective view of a driving source of a contact-and-separation mechanism as viewed from the front side of the image forming apparatus of FIG. 1, in which a primary transfer roller is arranged at a contact position, according to an embodiment of the present disclosure.
Figure 8:
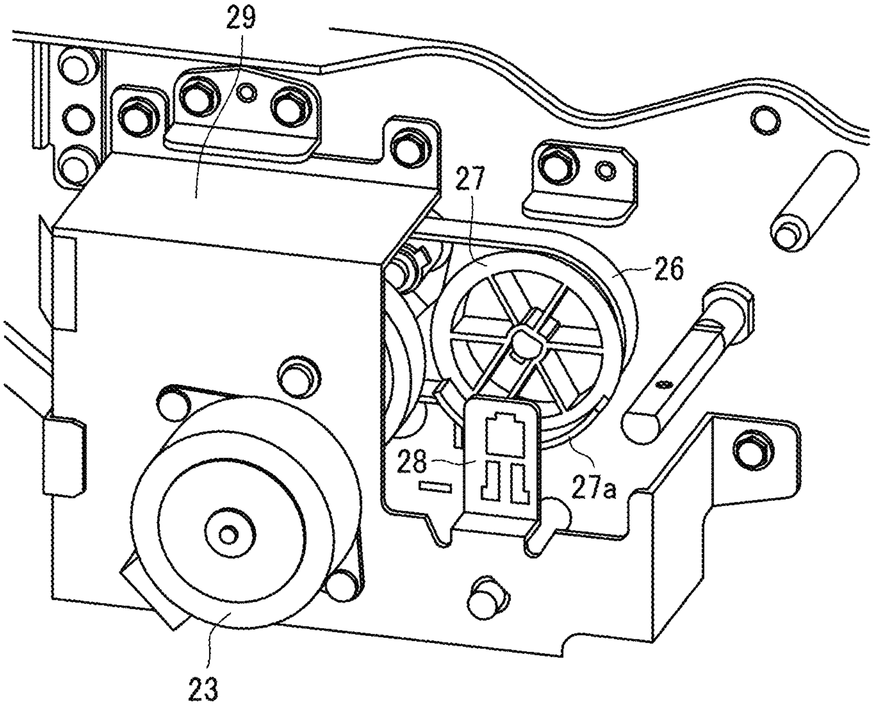
FIG. 8 is a perspective view of the driving source of the contact-and-separation mechanism of FIG. 5, viewed from the front side of the image forming apparatus of FIG. 1, in which a primary transfer roller is arranged at a large separation position, according to an embodiment of the present disclosure.

FIG. 5 illustrates a case in which the primary transfer roller 7T is arranged at the small separation position, FIG. 7 illustrates a case in which the primary transfer roller 7T is arranged at the contact position, and FIG. 8 illustrates a case in which the primary transfer roller 7T is arranged at the large separation position.

The motor 23 is driven by a predetermined number of pulses to rotate the feeler 27*a* counterclockwise to cause the primary transfer roller 7T to move from the large separation position at which the feeler 27*a* faces the photosensor 28 in FIG. 8. Subsequently, the motor 23 is stopped and held in a state in which the motor 23 can be driven to cause the primary transfer roller 7T to switch to the small separation position.

Next, the motor 23 is driven from the position in FIG. 8 by a predetermined number of pulses to rotate the feeler 27*a* clockwise. Subsequently, the motor 23 is stopped and held in the state in which the motor 23 can be driven to cause the primary transfer roller 7T to switch to the small separation position in FIG. 5. In other words, the position of the primary transfer roller 7T can be switched to the contact position and the small separation position via the large separation position.

The positions of the primary transfer roller 7T, the driven rollers 21A and 33A, and the sensor 22 are switched between the small separation position, the contact position, and the large separation position by the driving force of the single motor 23.

Further, the first contact-and-separation mechanism includes a motor that switches the primary transfer rollers 7Y 7M, and 7C of the central primary transfer section 202 between the contact position and the separation position, a feeler that detects the positions of the primary transfer rollers 7Y, 7M, and 7C, a motor that switches the primary transfer roller 7K of the most-upstream primary transfer section 201 between the contact position and the separation position, and a feeler that detects the position of the primary transfer roller 7K.

Figure 29:
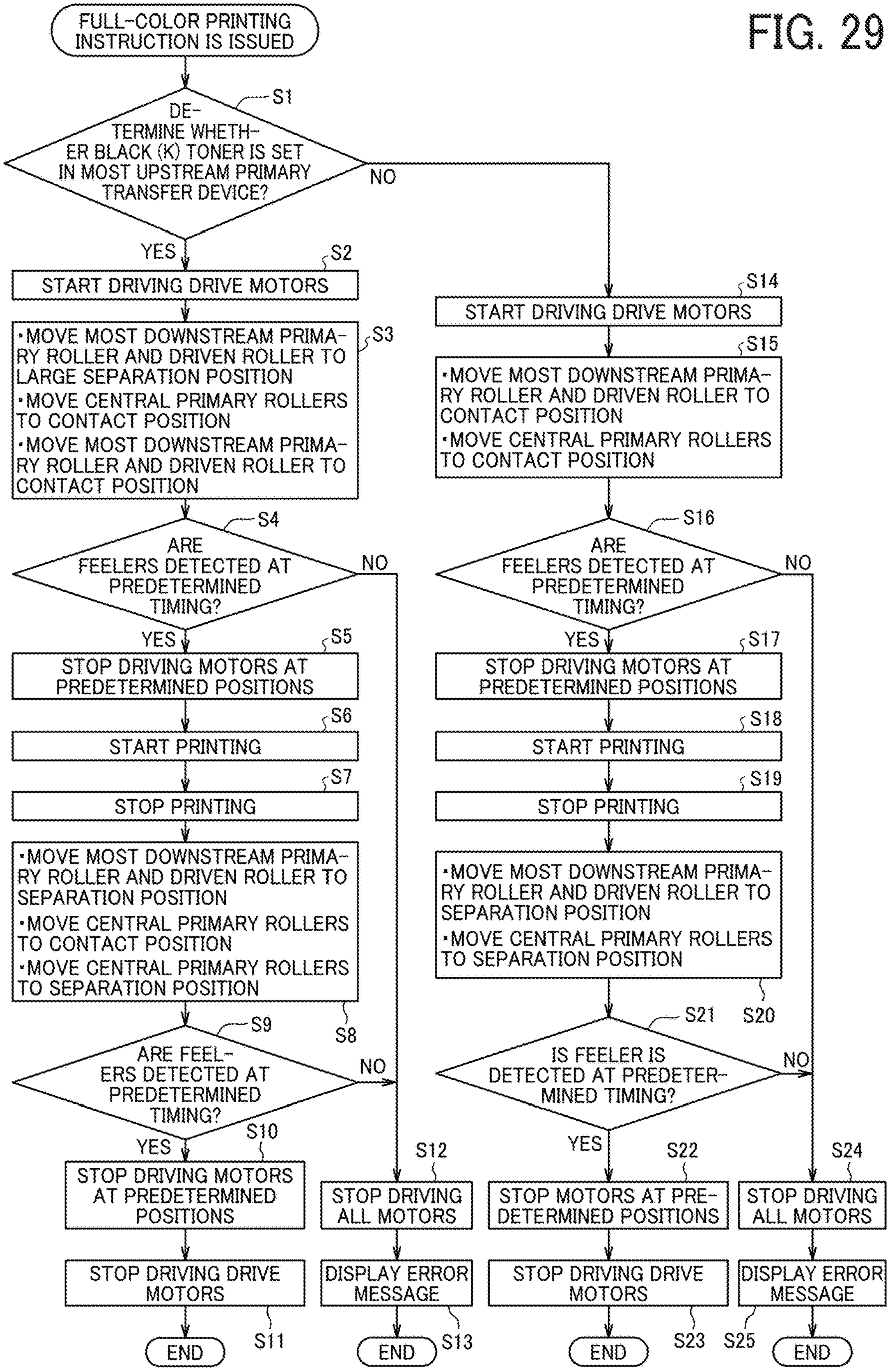
FIG. 29 is a flowchart of an operation procedure centered on a transfer section when full-color printing is performed, according to an embodiment of the present disclosure.
Figure 30:
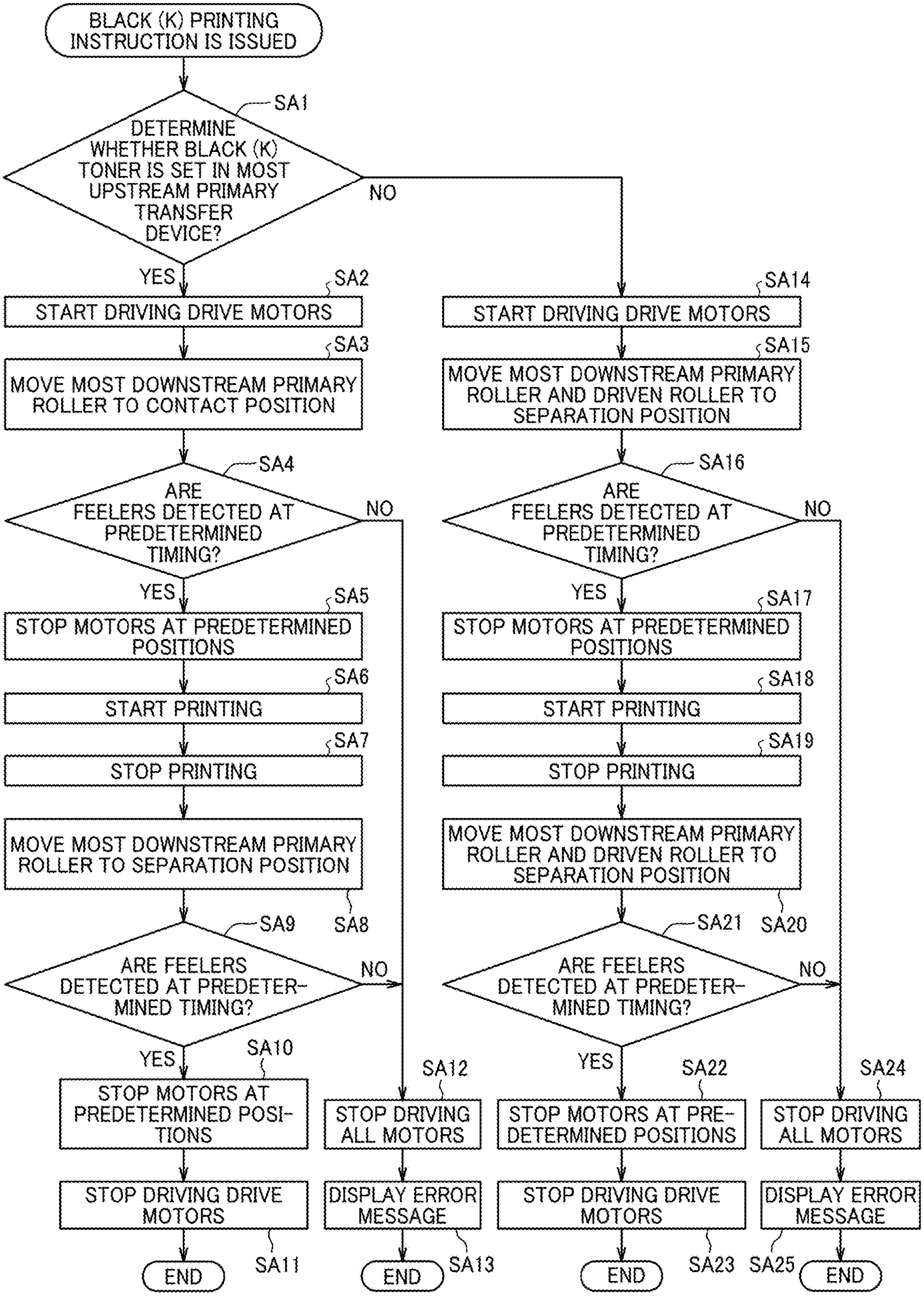
FIG. 30 is a flowchart of an operation procedure centered on the transfer section of FIG. 29 when black color printing is performed, according to an embodiment of the present disclosure.
Figure 31:
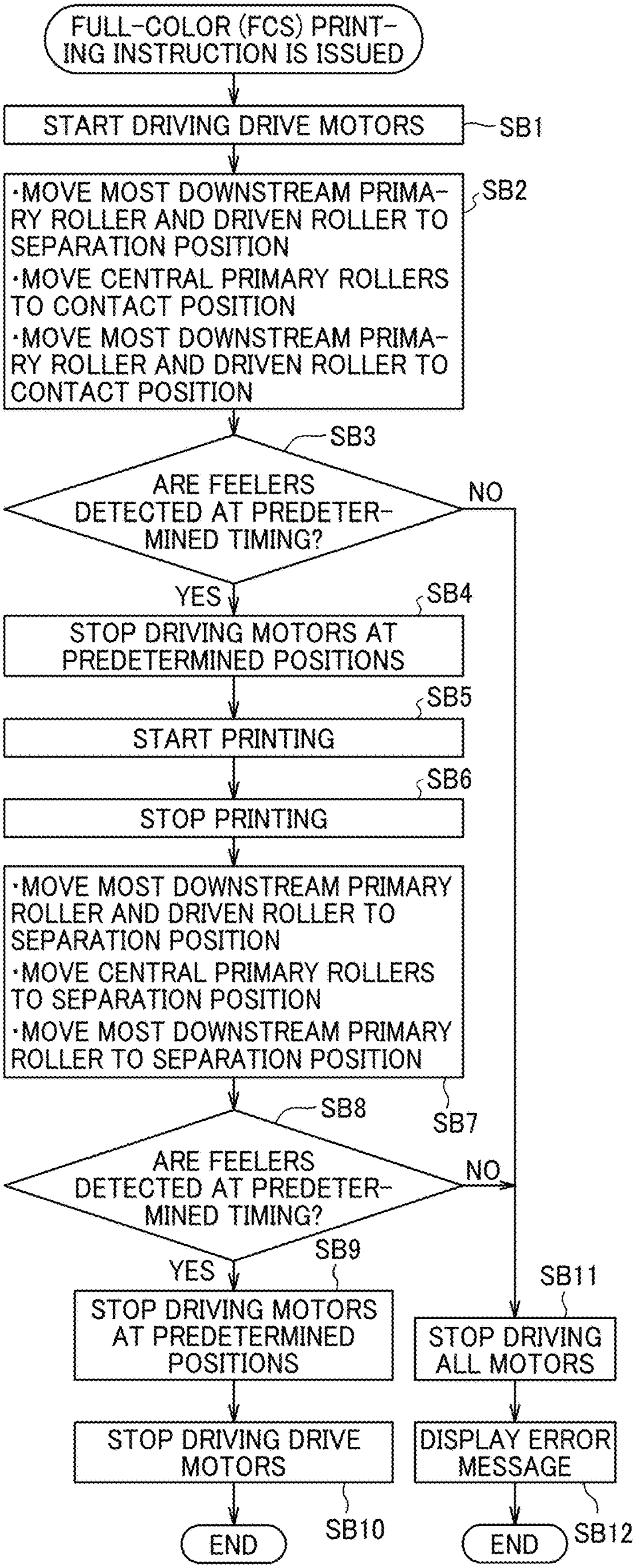
FIG. 31 is a flowchart of an operation procedure centered on the transferor of FIG. 29 when full-color and special color printing is performed, according to an embodiment of the present disclosure.

Next, an operation procedure of the most-upstream primary transfer section 201, the central primary transfer section 202, and the most-downstream primary transfer section 203 in different print modes below is described in order with reference to FIGS. 29, 30, and 31. FIG. 29 is a flowchart of an operation procedure centered on the transfer device 20 when full-color printing is performed, which is referred to simply as FC printing below, according to the present embodiment. FIG. 30 is a flowchart illustrating an operation procedure centered on the transfer device 20 when black color printing is performed, which is referred to simply as K printing below, according to the present embodiment. FIG. 31 is a flowchart illustrating an operation procedure centered on the transfer device 20 when fill-color and special color printing is performed, which is referred to simply as FCS printing below, according to the present embodiment.

The FC printing is described with reference to FIG. 29.

As illustrated in FIG. 29, first, when an instruction of the FC printing is issued, a controller 300 (see FIG. 25) of the image forming apparatus 1 checks whether the black (K) toner is set in the most-upstream primary transfer section 201 (step S1). When the black (K) toner is set in the most-upstream primary transfer section 201, the process proceeds to step S2, and driving motors for driving the intermediate transfer belt 2 and the photoconductors 3K, 3C, 3M, 3Y and 3T in the image forming apparatus 1 are driven to start an image forming operation in the image forming apparatus 1.

Then, the primary transfer rollers 7K, 7Y, 7M, 7C, and 7T are arranged at predetermined positions. To be more specific, the motor 23 (see FIG. 5) is driven to move the primary transfer roller 7T and the driven rollers 21A and 33A to the large separation positions and the motors corresponding to the motor 23 are driven such that the primary transfer rollers 7Y, 7M, and 7C of the central primary transfer section 202 and the primary transfer roller 7K of the most-upstream primary transfer section 201 are moved to the contact positions (step S3). In other words, only the primary transfer roller 7T of the most-downstream primary transfer section 203 for the special color is separated from the intermediate transfer belt 2, and the other primary transfer rollers 7K, 7Y, 7M, and 7C are moved to the contact positions such that the FC printing can be performed.

After driving of the motor 23 and the above-described motors are started, the controller 300 determines whether the feeler 27*a* is detected at a predetermined timing, in other words, whether the primary transfer rollers 7K, 7Y, 7M, 7C and 7T are arranged at the above-described respective predetermined positions (step S4). When the detection of the feeler 27*a* is normally performed, the controller 300 stops the motor 23 and the above-described motors and executes the printing operation (steps S5, S6, and S7). On the other hand, when the feeler 27*a* is not detected at the predetermined timing, some trouble may occur, for example, in the operation of the motors. For this reason, the motor 23 and the above-described motors and all the driving motors in the image forming apparatus 1 are stopped, and an error message is displayed on a display unit of the image forming apparatus 1, and the printing operation is ended (steps S12 and S13).

When the printing operation is normally finished, the controller 300 causes the primary transfer rollers 7K, 7Y, 7M, 7C and 7T to move to the respective separation positions. To be more specific, the controller 300 drives the motor 23 to move the primary transfer roller 7T and the driven rollers 21A and 33A to the separation positions and drives the motors such that the primary transfer rollers 7Y, 7M, 7C of the central primary transfer section 202 and the primary transfer roller 7K of the most-upstream primary transfer section 201 are moved to the separation position (step S8).

At this time also, the controller 300 determines whether the feelers have been detected at a predetermined timing (step S9). If the feelers have been detected at the predetermined timing, the controller 300 stops the motors at respective predetermined positions. Then, the controller 300 stops the driving motors in the image forming apparatus 1 to end the operation procedure (steps S10 and S11). When the feeler 27*a* has not been detected at the predetermined timing, the controller 300 stops all the motors, displays an error message on the display unit of the image forming apparatus and ends the printing operation (steps S12 and S13).

Further, in the case where the black (K) toner is not set in the most-upstream primary transfer section 201 in step S1, in other words, steps S14, S15, S16, S17, S18, S19, S20, S21, S22, S23, S24, and S25, which are performed when the black (K) toner is transferred by the primary transfer roller 7T of the most-downstream primary transfer section 203, also have a basic procedure similar to steps S2, S3, S4, S5, S6, S7, S8, S9, S10, S11, S12, and S13. As a difference from steps S2, S3, S4, S5, S6, S7, S8, S9, S10, S11, S12, and S13, in step S15, the controller 300 causes the primary transfer roller 7T of the most-downstream primary transfer section 203, which transfers the black (K) toner to move to the contact position and return to the separation position in step S20. The primary transfer roller 7K of the most-upstream primary transfer section 201 is not moved.

FIG. 30 is a flow chart illustrating a case in which the K printing is performed, according to the present embodiment. The basic procedure of the K printing is similar to the basic procedure of the FC printing illustrated in FIG. 29. FIG. 30 is different from FIG. 29 in that only the primary transfer roller 7K for transferring the black (K) toner is arranged at the contact position in the K printing.

To be more specific, when the black (K) toner is set in the most-upstream primary transfer section 201, the primary transfer roller 7K of the most-upstream primary transfer section 201 is arranged at the contact position in step SA4, and then moved to the separation position in step SA8. When the black (K) toner is set in the most-downstream primary transfer section 203, the primary transfer roller 7T and driven rollers 21A and 33A are arranged at the contact positions in step SA15, and then moved to the separation positions in step SA20.

FIG. 31 is a flow chart illustrating a case in Which the FCS printing is performed, according to the present embodiment. In the case of the FCS printing, the basic procedure is similar to the basic procedure of the above-described. K printing. However, in the case of the FCS printing, all the primary transfer rollers 7K, 7Y, 7M, 7C, and 7T are arranged at the contact positions regardless of whether the black (K) toner is set in the most-upstream primary transfer section 201 or the most-downstream primary transfer section 203 (step SB2). Thus, transfer from all the primary transfer rollers can be performed. After the FCS printing has been performed, all the primary transfer rollers 7K, 7Y, 7M, 7C, and 7T are returned to the separation position (step SB7). As described above, the FCS printing is different from the K printing in that there is no step for confirming whether the black (K) toner is set in the most-upstream primary transfer section 201 in the first step.

Figure 9:
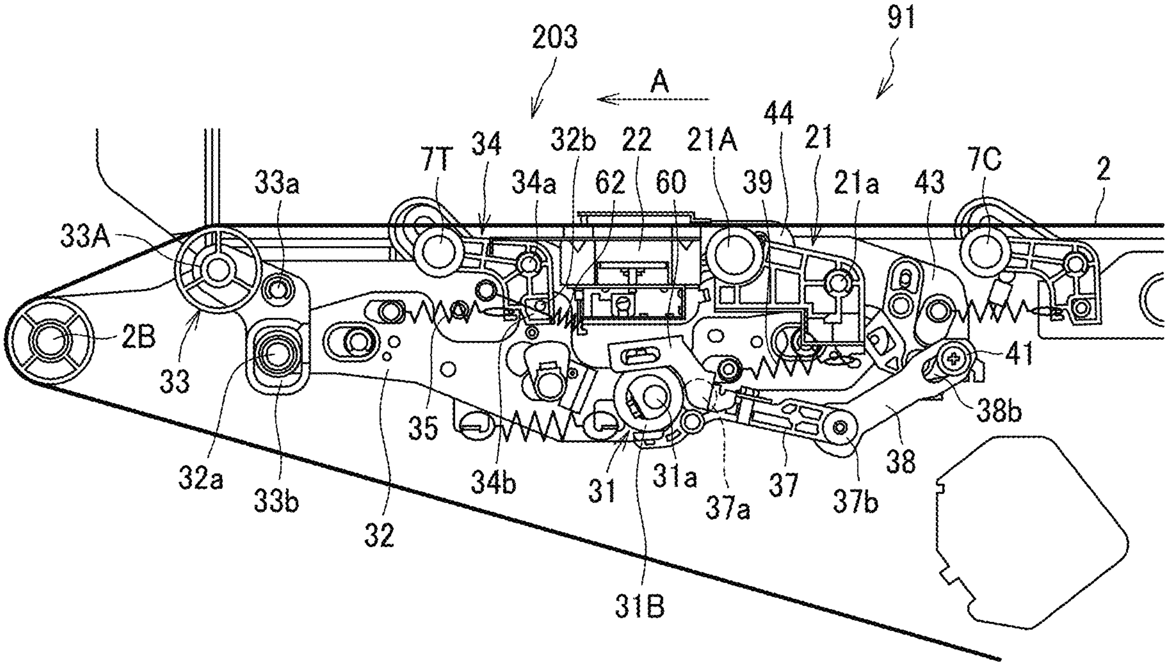
FIG. 9 is a cross-sectional view of a contact-and-separation mechanism viewed from the back side of the image forming apparatus of FIG. 1, in which a primary transfer roller of a most-downstream primary transfer section is arranged at a contact position relative to an intermediate transfer belt, according to an embodiment of the present disclosure.

Next, a first contact-and-separation mechanism 91 that causes the primary transfer roller 7T, the driven roller 21A, and the driven roller 33A to operate by the driving force of the motor 23 is described with reference to FIG. 9. FIG. 9 is a cross-sectional view of the first contact-and-separation mechanism 91 viewed from a rear side of the image forming apparatus 1, which is an opposite side to the image forming apparatus 1 in, for example, FIG. 1.

As illustrated in FIG. 9, the first contact-and-separation mechanism 91 includes a cam 31 to which the driving force of the above-described motor 23 is transmitted. The cam 31 includes a first cam 31A (see FIG. 12) and a second cam 31B and is rotatable about a rotation shaft 31*a*. The second cam 31B is a ball bearing having an outer ring. The second cam 31B is eccentric with respect to the rotation shaft 31*a*.

The first cam 31E contacts a front slider 32 that serves as a slider. As illustrated in FIG. 9, the front slider 32 is biased toward the left direction in FIG. 9 by springs. The driving force of the motor 23 causes the first cam 31A to rotate to change a surface of the first cam 31A that contacts the front slider 32. By so doing, the front slider 32 can move toward the right direction in FIG. 9 against the biasing force of the springs.

A driven roller 33A, which is one of rollers around which the intermediate transfer belt 2 is stretched, is disposed at one end of the rotator 33. The rotator 33 is rotatable about a rotation fulcrum 33*a*.

The rotator 33 includes a hole 33*b* at an end of the rotator 33 opposite to another end of the rotator 33 on which the driven roller 33A is disposed. An insertion portion 32*a* disposed on the front slider 32 is inserted in the hole 33*b*. The insertion portion 32*a* is formed by press-fitting a ball bearing into a shaft fixed to the front slider 32. Providing the ball bearings in the insertion portion 32*a* can reduce sliding resistance between the insertion portion 32*a* and the rotator 33.

The primary transfer roller 7T is disposed at one end of a rotator 34. The rotator 34 is rotatable about a rotation fulcrum 34*a*. The rotator 34 includes a hole 34*b* at an end of the rotator 34 opposite to another end of the rotator 34 on which the primary transfer roller 7T is disposed. A pin 32*b* disposed on the front slider 32 is inserted in the hole 34*b*.

A spring 35 is fixed to a housing of the image forming apparatus 1 and biases the rotator 34 in a direction in which the rotator 34 rotates clockwise in FIG. 9 about the rotation fulcrum 34*a*. The driven roller 33A is the first tension roller disposed downstream from the primary transfer roller 7T of the most-downstream primary transfer section 203 in the rotation direction of the intermediate transfer belt 2.

When the front slider 32 moves in the left-right direction in FIG. 9, the insertion portion 32*a* presses the rotator 33 to cause the rotator 33 to rotate about the rotation fulcrum 33*a*. Accordingly, the position of the driven roller 33A is changed. Further, when the front slider 32 moves in the right direction in FIG. 9, the rotator 34 is pressed by the pin 32*b* and rotates counterclockwise in FIG. 9 about the rotation fulcrum 34*a* against the biasing force of the spring 35.

Alternatively, when the front slider 32 moves in the left direction in FIG. 9, the rotator 34 rotates clockwise about the rotation fulcrum 34*a* by the biasing force of the spring 35. Thus, the primary transfer roller 7T disposed on the rotator 34 contacts with and separates from the photoconductor 3T.

As illustrated in FIG. 9, the driven roller 21A around which the intermediate transfer belt 2 is stretched is disposed and driven by the rotation of the intermediate transfer belt 2. The driven roller 21A is disposed upstream from the primary transfer roller 7T and downstream from the primary transfer roller 7C immediately upstream from the primary transfer roller 7T in the rotation direction of the intermediate transfer belt 2.

The driven roller 21A is disposed at one end of the rotator 21. The rotator 21 is rotatable about a rotation fulcrum 21*a*. The rotator 21 receives a force from a spring 39 acting in a direction such that the rotator 21 rotates clockwise about the rotation fulcrum 21*a*.

In FIG. 9, the primary transfer roller 7T of the most-downstream primary transfer section 203 is arranged at the contact position. In the above-described state, the front slider 32 is arranged at a leftmost position in FIG. 9 compared with other two states in which the front slider 32 is arranged in FIG. 10 and FIG. 11. When the first cam 31A (see FIG. 12) is rotated to a predetermined position to cause the primary transfer roller 7T of the most-downstream primary transfer section 203 to be arranged at the small separation position, the front slider 32 moves to the right relative to FIG. 9 as illustrated in FIG. 10.

Figure 10:
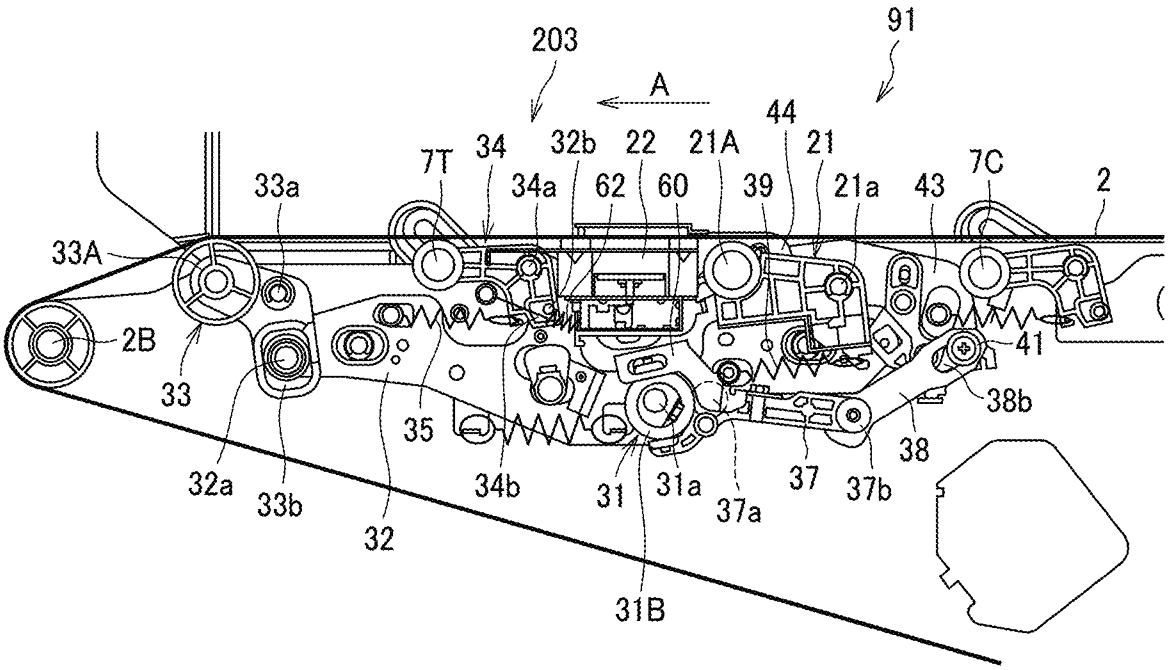
FIG. 10 is a cross-sectional view of the contact-and-separation mechanism of FIG. 9, in which the primary transfer roller of the most-downstream primary transfer section is arranged at a small separation position relative to the intermediate transfer belt, according to an embodiment of the present disclosure.
Figure 11:
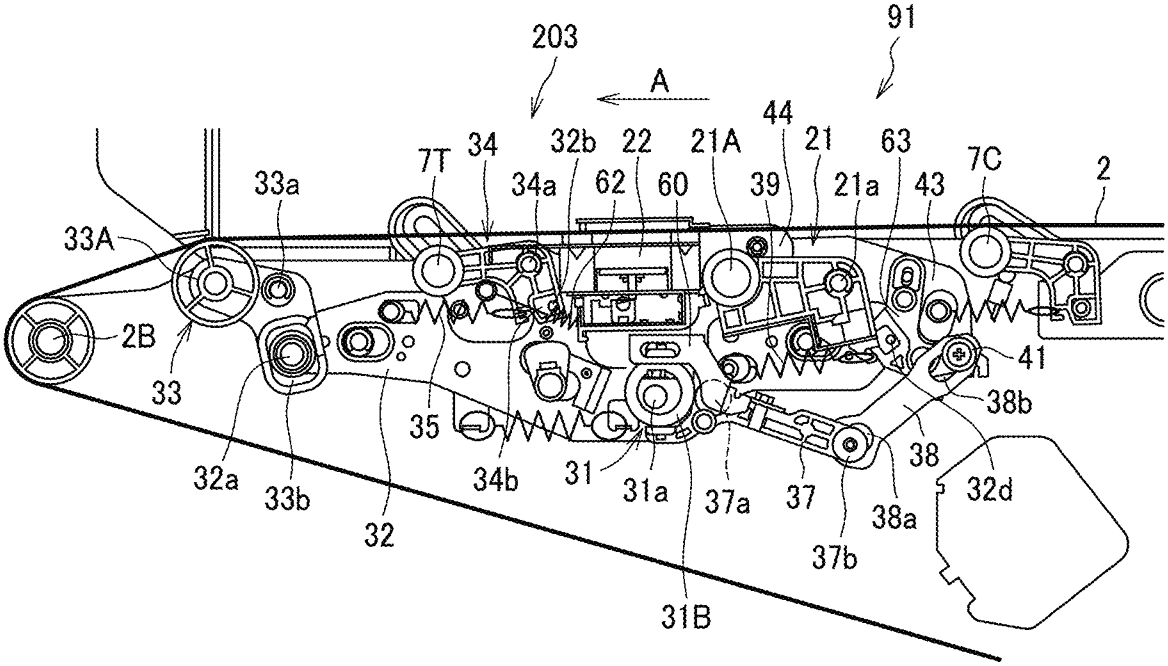
FIG. 11 is a cross-sectional view of the contact-and-separation mechanism of FIG. 9, in which the primary transfer roller of the most-downstream primary transfer section is arranged at a large separation position relative to the intermediate transfer belt, according to an embodiment of the present disclosure.

Further, when the first cam 31A is rotated to a predetermined position to cause the primary transfer roller 7T of the most-downstream primary transfer section 203 to be arranged at the large separation position, the front slider 32 moves to the right relative to FIGS. 9 and 10, as illustrated in FIG. 11.

For example, as illustrated in FIGS. 9, 10, and 11 in order, when the front slider 32 moves in the right direction in FIG. 9, the rotator 34 rotates counterclockwise about the rotation fulcrum 34*a* against the biasing force of the spring 35, and the primary transfer roller 7T moves in the direction away from the photoconductor 3T.

When the primary transfer roller 7T is arranged at the small separation position in FIG. 10 and at the large separation position in FIG. 11, the primary transfer roller 7T is separated from the photoconductor 3T. Further, when the front slider 32 moves in the right direction in FIG. 9, the rotator 33 rotates counterclockwise about the rotation fulcrum 33*a* and the driven roller 33A moves in a direction away from the intermediate transfer belt 2.

The driven roller 33A stretches the intermediate transfer belt 2 in all the states of FIGS. 9, 10, and 11. However, the position at which the intermediate transfer belt 2 is stretched by the driven roller 33A is a position farther away from the photoconductor 3T, which is on the upper side of FIGS. 9, 10, and 11, in the order of FIGS. 9, 10, and 11.

Next, when the front slider 32 moves in the right direction in FIG. 9, a pin 32*c* (see FIG. 15) disposed on the front slider 32 presses a side of the rotator 21 opposite to a side of the rotator 21 on which the driven roller 21A is disposed. Accordingly, the rotator 21 rotates counterclockwise about the rotation fulcrum 21*a* against the biasing force of the spring 39. Thus, the driven roller 21A moves away from the intermediate transfer belt 2 in FIGS. 10 and 11.

As described above, changing the position of the driven roller 33A at timings when the primary transfer roller 7T is arranged at the contact position, the small separation position, and the large separation position allows the position at which the intermediate transfer belt 2 is stretched by the driven roller 33A in each state to be changed.

Accordingly, the intermediate transfer belt 2 can be stretched at a favorable position, and the rotation speed of the intermediate transfer belt 2 can be accurately detected by the sensor 22. In particular, in the present embodiment, the driven roller 33A is disposed downstream from the primary transfer roller 7T of the most-downstream primary transfer section 203. The position at which the intermediate transfer belt 2 is stretched by the driven roller 33A is changed in all of the three positions of the driven roller 33A described above. Thus, the posture of the intermediate transfer belt 2 in which the intermediate transfer belt 2 is stretched in each of the states can be appropriately changed. Accordingly, the sensor 22 can accurately detect the rotation speed of the intermediate transfer belt 2.

Furthermore, specifically in the above-described mode E in which the primary transfer roller 7T is arranged at the large separation position, the rotator 33 is largely rotated counterclockwise in FIG. 11 to move the driven roller 33A in a direction away from the photoconductor 3T. By so doing, the position at which the intermediate transfer belt 2 is stretched by the driven roller 33A can be shifted downward in FIG. 11.

In the mode E, the primary transfer rollers 7Y, 7M, and 7C of the central primary transfer section 202 contact the intermediate transfer belt 2 to lift the intermediate transfer belt 2. Accordingly, the intermediate transfer belt 2 is located at a position closer to the photoconductor 3T. Accordingly, shifting the position at which the intermediate transfer belt 2 is stretched downward in FIG. 11 can prevent the photoconductor 3T (see FIG. 2) and the intermediate transfer belt 2 from being damaged due to interference between the photoconductor 3T and the intermediate transfer belt 2.

Next, a mechanism for moving the sensor 22 among the mechanisms included in the first contact-and-separation mechanism 91 is described below.

As illustrated in FIG. 9, an outer peripheral surface of the second cam 31B disposed in the cam 31 is held by a first arm 37 that serves as a first link member or a second transmission member. The first arm 37 is rotatable about a rotation fulcrum 37*a*. The rotation fulcrum 37*a* is fixed to the front slider 32 via a ball bearing. As illustrated in FIG. 9, the rotation of the second cam 31B causes the first arm 37 to rotate about the rotation fulcrum 37*a*. In addition, as the front slider 32 moves by rotation of the first cam 31A (see FIG. 12) disposed in the cam 31, the first arm 37 moves in the left-right direction in FIG. 9.

Figure 12:
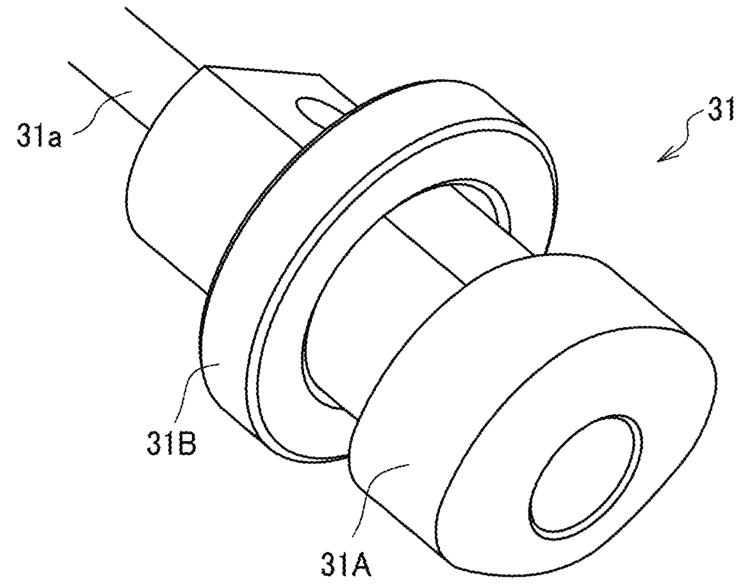
FIG. 12 is a perspective view of a cam according to an embodiment of the present disclosure.

FIG. 12 is a perspective view of the cam 31. As illustrated in FIG. 12, the cam 31 includes the first cam 31A and the second cam 31B. The cam 31 is rotatable about the rotation shaft 31*a*. The first cam 31A has a small-diameter portion, a medium-diameter portion, and a large-diameter portion each having a different diameter by 120 degrees.

Figure 13:
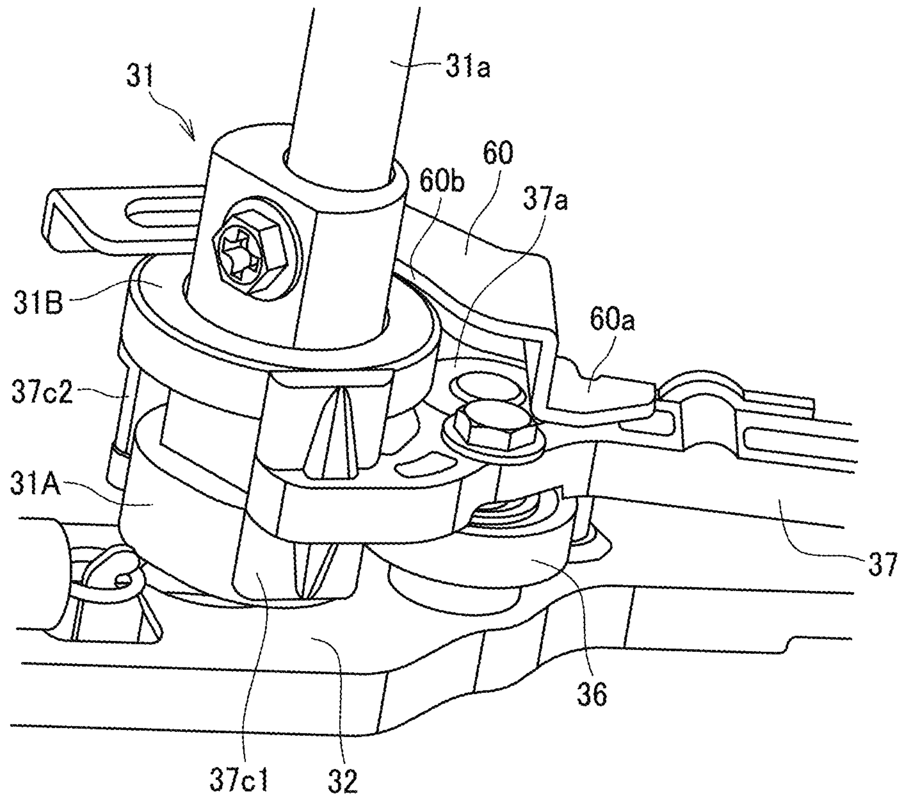
FIG. 13 is a perspective view of a cam and components around the cam viewed from the back side of FIG. 12, according to an embodiment of the present disclosure.

As illustrated in FIG. 13, the first cam 31A is in contact with a cam follower 36 formed of a ball bearing. The cam follower 36 is a first transmitter provided for the first arm 37. Rotation of the first cam 31A changes a surface of the first cam 31A that contacts the cam follower 36. By so doing, the front slider 32 can be moved in the left-right direction in FIG. 9.

In addition, when the front slider 32 moves, the first arm 37 with the rotation fulcrum 37*a* fixed to the front slider 32 moves in the left-right direction in FIG. 9 in conjunction with the movement of the front slider 32.

Figure 14:
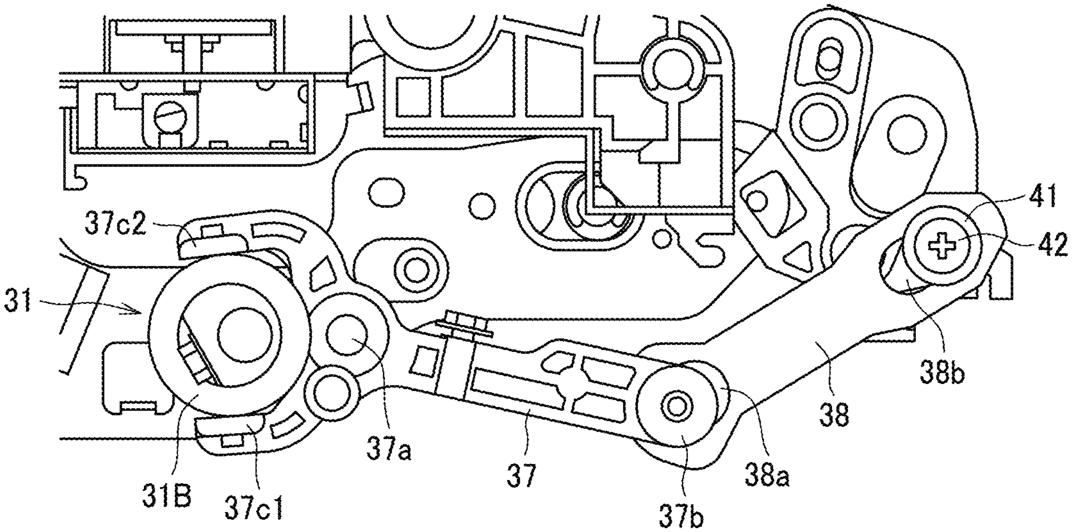
FIG. 14 is a plan view of a configuration around a first arm and a second arm according to an embodiment of the present disclosure.

As illustrated in FIGS. 13 and 14, the first arm 37 holds the second cam 31B at two positions at which a handle 37*c*1 and a handle 37*c*2 are disposed. The rotation of the second cam 31B causes the first arm 37 to rotate about the rotation fulcrum 37*a*.

As illustrated in FIG. 13, a thrust stopper 60 that serves as a restrictor and a slip-off stopper is attached to the first arm 37. The thrust stopper 60 includes a contact portion 60*a* and a restricting portion 60*b* as slip-off stoppers. Bringing the contact portion 60*a* into contact with the rotation fulcrum 37*a* of the first arm 37 from above in FIG. 13 prevents the rotation fulcrum 37*a* from coming off the front slider 32.

FIG. 14 is a side view of the first arm 37 in which the thrust stopper 60 is removed from the first arm 37, according to the present embodiment. The thrust stopper 60 also contacts the rotation fulcrum 37*a* from the lower side in FIG. 13 to prevent the rotation fulcrum 37*a* from coming off in a downward direction in FIG. 13. The restricting portion of the thrust stopper 60 is a surface of the thrust stopper 60 provided along the outer peripheral surface of the outer ring disposed on the second cam 31B as the ball bearing. The restricting portion 60*b* regulates the position of the outer peripheral surface of the second cam 31B. Accordingly, a direction in which the first arm 37 moves relative to the second cam 31B can be restricted. In other words, the first arm 37 can be restricted from moving in a direction along the outer peripheral surface of the second cam 31B, for example, in a direction in which the first arm 37 slides toward the second cam 31B. Accordingly, the positional shift of the first arm 37, such as inclination of the first arm 37 with respect to the second cam 31B can be prevented, and wear of the handles 37*c*1 and 37*c*2 can be prevented.

In the present embodiment, the contact portion 60*a* that functions as the slip-off stopper to prevent the first arm 37 from coming off the front slider 32 and the restricting portion 60*b* that regulates the direction in which the first arm 37 moves relative to the second cam 31B are integrated with the thrust stopper 60. Accordingly, the number of components of the transfer device 20 can be reduced. However, the contact portion 60*a* and the restricting portion 60*b* may be disposed as separate components.

Figure 15:
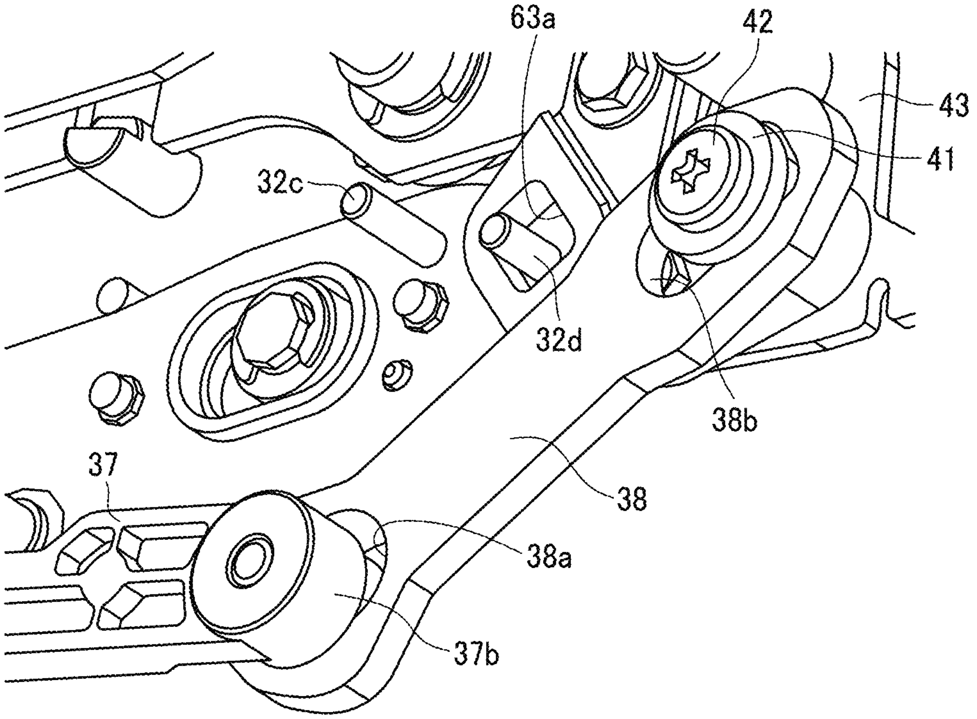
FIG. 15 is a perspective view of the second arm of FIG. 14 and components around the second arm; according to an embodiment of the present disclosure.
Figure 16:
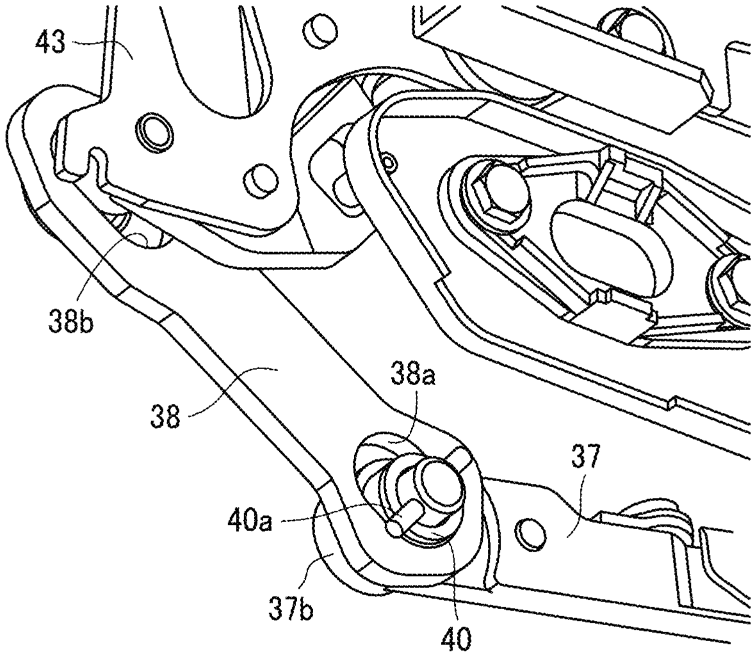
FIG. 16 is a perspective view of the second arm of FIG. 14 and components around the second arm viewed from the back side of FIG. 15, according to an embodiment of the present disclosure.

FIG. 15 is a perspective view of the first arm 37, a second arm 38, and components around the first arm 37 and the second arm 38 viewed from a front side of the image forming apparatus 1, according to the present embodiment. FIG. 16 is a perspective view of the first arm 37, the second arm 38, and components around the first arm 37 and the second arm 38 viewed from a rear side of the image forming apparatus 1, according to the present embodiment.

As illustrated in FIG. 15, the second arm 38 that serves as a second link member includes an elongated hole 38*a* and an elongated hole 38*b* at both ends of the second arm 38. An end 37*b* of the first arm 37 is inserted into the elongated hole 38*a* of the second arm 38. As illustrated in FIG. 16, the end 37*b* of the first arm 37 includes a bearing 40. The bearing is disposed to be movable in the elongated hole 38*a* in a longitudinal direction of the elongated hole 38*a*. The bearing 40 serves as an insertion portion to insert into the elongated hole 38*a*.

The bearing 40 includes a parallel pin 40*a* that serves as a slip-off stopper in a rear portion of the bearing 40. The length of the parallel pin 40*a* is set to be shorter than the length of the elongated hole 38*a* in the longitudinal direction of the elongated hole 38*a*. Arranging the parallel pin 40*a* substantially parallel to the longitudinal direction of the elongated hole 38*a* allows the bearing 40 to be inserted into the elongated hole 38*a*. As described above, in the three states in which the primary transfer roller 7T is arranged at the contact position, the small separation position, and the large separation position, the parallel pin 40*a* does not rotate to a position at which the parallel pin 40*a*, is parallel to the longitudinal direction of the elongated hole 38*a*. Accordingly, the parallel pin 40*a* functions as the slip-off stopper to prevent the bearing 40 from coming off the elongated hole 38*a*.

As illustrated in FIG. 15, a bearing 41 is inserted into the elongated hole 38*b*. The bearing 41 is fixed to a first sensor bracket 43 as a holder by a step screw 42. The bearing 41 is movable in the elongated hole 38*b*. The bearing 41 serves as an insertion portion to insert into the elongated hole 38*b*.

Rotation of the cant 31 causes the front slider 32 to be moved from the position of the front slider 32 in FIG. 9 or FIG. 10 to the right side of FIG. 10 to cause the primary transfer roller 7T of the most-downstream primary transfer section 203 to move to the large separation position. By so doing, the second cam 31B rotates to cause the first arm 37 to rotate clockwise about the rotation fulcrum 37*a*.

Accordingly, the end 37*b* of the first arm 37 moves downward in FIG. 9 or 10. Accordingly, as illustrated in FIG. 11, the end 37*b* moves to an end of the elongated hole 38*a* in the longitudinal direction and contacts a wall surface forming the elongated hole 38*a* to pull the second arm 38 in a lower left direction in FIG. 11. Accordingly, the bearing 41 moves to an end of the elongated hole 38*b* in the longitudinal direction and contacts a wall surface forming the elongated hole 38*b*. Then, the second arm 38 pulls the first sensor bracket 43 in the lower left direction in FIG. 11.

Figure 17:
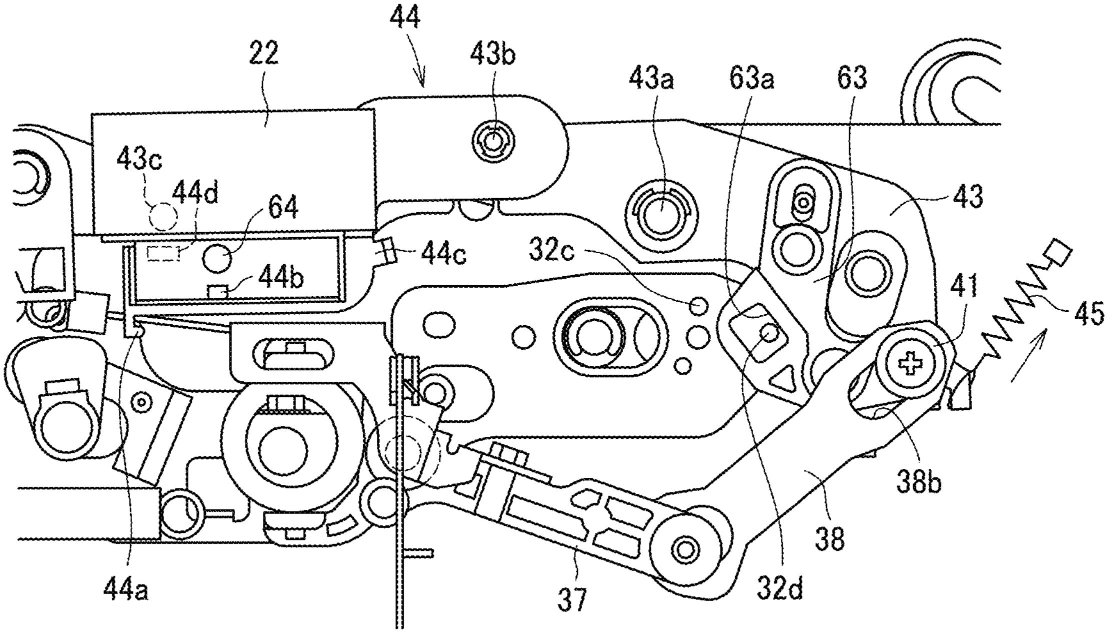
FIG. 17 is a plan view of a configuration around a first sensor bracket and a sensor, according to an embodiment of the present disclosure.

FIG. 17 is a diagram illustrating a configuration or structure around the first sensor bracket 43 and the sensor 22 and is a diagram of the configuration in which the rotator 21 is removed from FIG. 9, according to the present embodiment. In FIG. 17, the sensor 22 and a second sensor bracket 44 are illustrated in a simplified manner for the sake of convenience.

As illustrated in FIG. 17, the first sensor bracket 43 is rotatable about the rotation fulcrum 43*a*. The first sensor bracket 43 receives a force from the spring 45 fixed to the housing of the image forming apparatus 1 in a direction in which the first sensor bracket 43 rotates counterclockwise in FIG. 17 about the rotation fulcrum 43*a*.

A restrictor 63 is fixed to the first sensor bracket 43. A pin 32*d* of the front slider 32 is inserted into a hole 63*a* of the restrictor 63. When the primary transfer roller 7T of the most-downstream primary transfer section 203 is arranged at the contact position in FIG. 9 and at the small separation position in FIG. 10, the pin 32*d* contacts a wall surface forming walls of the hole 63*a*. By so doing, the front slider 32 applies a force to the first sensor bracket 43 such that the first sensor bracket 43 rotates clockwise about the rotation fulcrum 43*a* in FIG. 17.

The second sensor bracket 44 is fixed to the first sensor bracket 43 via a stud 43*b* disposed on the first sensor bracket 43. The second sensor bracket 44 holds the sensor 22. The second sensor bracket 44 includes a hook 44*a* to which one end of a spring 62 (see FIG. 9) is attached, a first contact portion 44*b*, and a second contact portion 44*c*.

When the primary transfer roller 7T of the most-downstream primary transfer section 203 is arranged at the contact position in FIG. 9, the second sensor bracket 44 is biased by the spring 62 to move in a direction in which the second sensor bracket 44 rotates clockwise about the rotation fulcrum 43*a* and is positioned at a position at which the first contact portion 44*b* contacts a stud 64 disposed on the housing of the image forming apparatus 1.

On the other hand, in the state in which the primary transfer roller 7T of the most-downstream primary transfer section 203 is arranged at the small separation position in FIG. 10, the pin 32*d* disposed on the front slider 32 moves to the right side of FIG. 9. By so doing, the first sensor bracket 43, the second sensor bracket 44, and the sensor 22 receive a force to rotate counterclockwise about the rotation fulcrum 43*a* due to their own weight and the biasing force of the spring 45.

Figure 18:
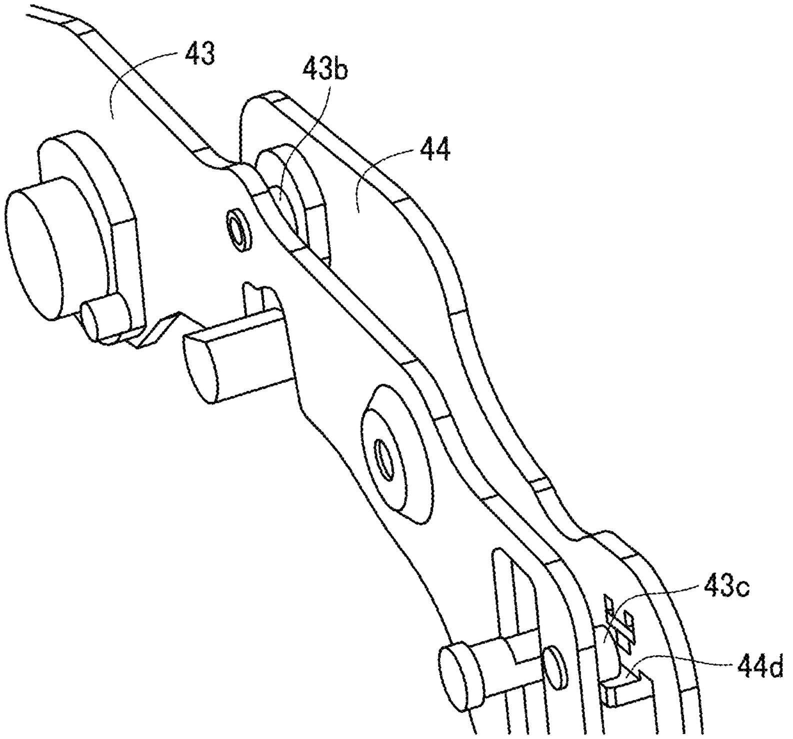
FIG. 18 is a perspective view of a first sensor bracket and a second sensor bracket as viewed from the front side of the image forming apparatus of FIG. 1, according to an embodiment of the present disclosure.

A pin 43*c* disposed on the first sensor bracket 43 illustrated in FIG. 18 presses a bent portion 44*d* of the second sensor bracket 44, and the second sensor bracket 44 receives a force such that the second sensor bracket 44 rotates counterclockwise about the rotation fulcrum 43*a* in FIG. 10.

Accordingly, the first sensor bracket 43, the second sensor bracket 44, and the sensor 22 rotate counterclockwise in FIG. 10 and move downward in FIG. 10, which is a direction away from the photoconductor 3 as compared with FIG. 9. Note that FIG. 18 is a perspective view of the first sensor bracket 43 and the second sensor bracket 44 viewed from the back side of the sheet surface of FIG. 10.

When the primary transfer roller 7T of the most-downstream primary transfer section 203 is arranged at the large separation position in FIG. 11, the pin 32*d* is further moved rightward to release a force of the pin 32*d* pressing the restrictor 63 leftward in FIG. 17 as illustrated in FIG. 17. At the same time, the second arm 38 pulls the first sensor bracket 43 in a lower left direction in FIG. 17 as described above to rotate the first sensor bracket 43 clockwise about the rotation fulcrum 43*a* in FIG. 17.

Figure 19:
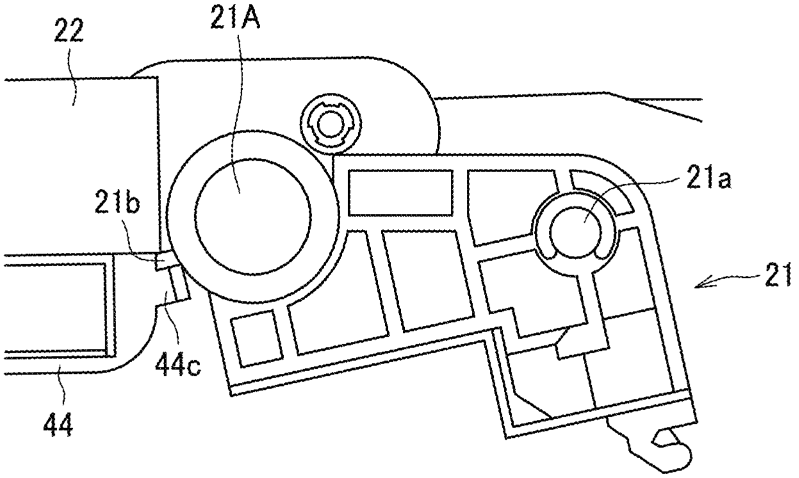
FIG. 19 is a plan view of a second sensor bracket and a rotator in which the second sensor bracket is arranged when the primary transfer roller is arranged at a large separation position, according to an embodiment of the present disclosure.

Accordingly, the second sensor bracket 44 fixed to the first sensor bracket 43 via the stud 43*b* moves upward in FIG. 17, and the sensor 22 also moves upward in FIG. 17. At this time, as illustrated in FIG. 19, the second sensor bracket 44 is positioned at a position at which the second contact portion 44*c* of the second sensor bracket 44 contacts a positioning portion 21*b* of the rotator 21.

In other words, the upward movement of the second sensor bracket 44 and the sensor 22 in FIG. 17 is restricted, and the sensor 22 is positioned. In the present embodiment, the above-described position at which the sensor 22 is positioned is a position lower than a position of the sensor 22 when the primary transfer roller 7T of the most-downstream primary transfer section 203 is arranged at the contact position in FIG. 9 and upper than the position of the sensor 22 when the primary transfer roller 7T of the most-downstream primary transfer section 203 is arranged at the small separation position in FIG. 10.

As described above, the driving force of the cam 31 is transmitted to the first sensor bracket 43 via the link members such as the first arm 37 and the second arm 38 to rotate the first sensor bracket 43. By so doing, the first sensor bracket 43 can be rotated in a desired direction.

In particular, in the present embodiment, the rotational force of the first arm 37 is transmitted to the second arm 38 only when a predetermined condition is satisfied. Accordingly, the driving force by the rotation of the cam 31 to the sensor 22 can be transmitted only when a specific positional change is performed.

To be more specific, the second arm 38 is connected to the first arm 37 and the first sensor bracket 43 via the elongated holes 38*a* and 38*b*, respectively, disposed in the second arm 38. Accordingly, the second arm 38 can be retracted to move the sensor 22 downward, for example, in FIG. 11 only when the primary transfer roller 7T of the most-downstream primary transfer section 203 is arranged at the large separation position.

In other words, compared with the primary transfer roller 7T and the driven rollers 21A and 33A that move in a constant direction with the movement of the front slider 32, the sensor 22 moves upward in FIG. 10 when the primary transfer roller 7T of the most-downstream primary transfer section 203 moves from the contact position to the small separation position. Alternatively, the sensor 22 moves downward, for example, in FIG. 11 when the primary transfer roller 7T of the most-downstream primary transfer section 203 moves from the contact position to the large separation position or from the small separation position to the large separation position. Thus, the sensor 22 moves in a direction opposite to the direction in which the front slider 32 moves.

When the primary transfer roller 7T of the most-downstream primary transfer section 203 is arranged at the small separation position, the primary transfer roller 7K of the most-upstream primary transfer section 201 and the primary transfer rollers 7Y, 7M, and 7C of the central primary transfer section 202 separate from the photoconductors 3K, 3Y, 3M, and 3C, respectively. Accordingly, the position at which the intermediate transfer belt 2 is stretched moves downward in FIG. 10.

On the other hand, when the primary transfer roller 7T of the most-downstream primary transfer section 203 is arranged at the large separation position, the primary transfer rollers 7Y, 7M, and 7C of the central primary transfer section 202 contact the photoconductors 3Y, 3M, and 3C, respectively, via the intermediate transfer belt 2. Thus, the position at which the intermediate transfer belt 2 is stretched is pushed upward in FIG. 11.

Accordingly, changing the position of the sensor 22 as described above allows the sensor 22 to be positioned at a favorable position corresponding to the position at which the intermediate transfer belt 2 is stretched. Accordingly, in each of the modes A, B, C, D, E, and F, the detection accuracy of the sensor 22 with respect to the intermediate transfer belt 2 can be enhanced, and the traveling speed or rotation speed of the intermediate transfer belt 2 can be controlled with high accuracy.

Further, the first contact-and-separation mechanism 91 can perform the operation of the sensor 22 and the operations of the primary transfer roller 7T and the driven rollers 21A and 33A by the driving force of the motor 23 as a single driving source. Accordingly, energy saving and a reduction in the number of components of the transfer device 20 can be achieved.

However, the number of link members coupled to the first sensor bracket 43 holding the sensor 22 is not limited to two as in the present embodiment. In some embodiments, the number of the link members may be three or greater than or one. Further, the combination of the elongated hole and the insertion member such as a pin inserted into the elongated hole may be reversed. It is not necessarily need to operate all of the sensor 22, the primary transfer roller 7T, and the driven rollers 21A and 33A by the driving force of the motor 23.

As described above, in the present embodiment, the rotation of the first cam 31A illustrated in FIG. 12 causes the front slider 32 to move in the left-right direction in FIG. 9. By so doing, the primary transfer rollers 7 and the driven rollers 21A and 33A can be moved.

Furthermore, rotation of the first cam 31A and the second cam 31B can cause the sensor 22 to move. To be specific, when the primary transfer roller 7T of the most-downstream primary transfer section 203 is arranged at the contact position in FIG. 9 and the small separation position in FIG. 10, the pin 32*d* (see FIG. 16) moved by the rotation of the first cam 31A presses against and applies a force to the first sensor bracket 43 in a direction such that the first sensor bracket 43 rotates clockwise. Thus, the position of the sensor 22 can be changed. When the primary transfer roller 7T of the most-downstream primary transfer section 203 is arranged at the large separation position, the rotation of the second cam 31B causes the first sensor bracket 43 to be pulled by the second arm 38. Accordingly, the position of the sensor 22 can be changed.

Next, a second contact-and-separation mechanism 92 as a second movement mechanism and a third contact-and-separation mechanism 93 as a third movement mechanism are described with reference to FIG. 20. The second contact-and-separation mechanism 92 brings the primary transfer rollers 7C, 7M and 7Y disposed in the central primary transfer section 202 into contact with and separate from the intermediate transfer belt 2. The third contact-and-separation mechanism 93 brings the primary transfer roller 7K disposed in the most-upstream primary transfer section 201 into contact with and separate from the intermediate transfer belt 2.

Figure 20:
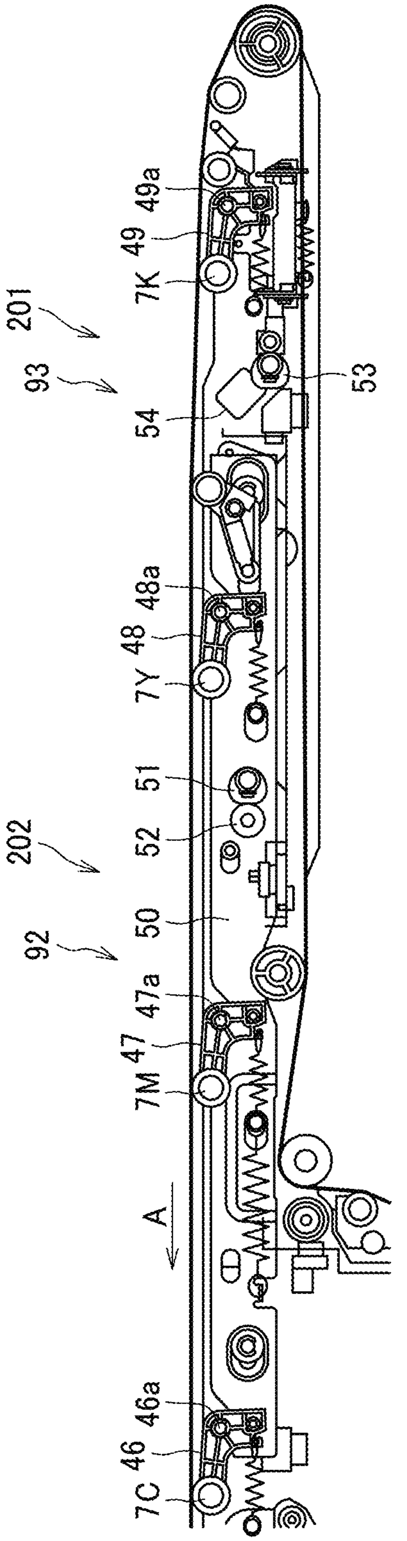
FIG. 20 is a side view of a configuration in which a central primary transfer section and a most-upstream primary transfer section contact with or separate from an intermediate transfer belt, according to an embodiment of the present disclosure.

As illustrated in FIG. 20, the second contact-and-separation mechanism 92 includes rotators 46, 47, and 48, a cam 51, and a cam follower 52. The third contact-and-separation mechanism 93 includes a rotator 49, a cam 53, and a cam follower 54. The second contact-and-separation mechanism 92 includes a motor as a driving source for rotating the cam 51, and the third contact-and-separation mechanism 93 includes a motor as a driving source for rotating the cam 53.

The rotators 46, 47, 48, and 49 are rotatable about the rotation fulcrums 46*a*, 47*a*, 48*a*, and 49*a*, respectively. The primary transfer roller 7C is disposed at one end of the rotator 46. The primary transfer roller 7M is disposed at one end of the rotator 47.

The primary transfer roller 7Y is disposed at one end of the rotator 48. The primary transfer roller 7K is disposed at one end of the rotator 49. The rotators 46, 47, 48, and 49 are biased by springs to be rotated clockwise in FIG. 20 and cause the primary transfer rollers 7C, 7M, 7Y, and 7K, respectively, to contact the photoconductors 3C, 3M, 3Y, and 3K, respectively, via the intermediate transfer belt 2.

The cam follower 52 rotates by the rotation of the cam 51, and a front slider 50 of the most-upstream primary transfer section 201 moves in the right direction in FIG. 20, Accordingly, one end of each of the rotators 46, 47, and 48 opposite to another end at which the corresponding one of the primary transfer rollers 7C, 7M, and 7Y is disposed is pressed. Accordingly, the rotators 46, 47, and 48 rotate counterclockwise in FIG. 20 against the biasing force of the springs.

Accordingly, the primary transfer rollers 7C, 7M, and 7Y move away from the intermediate transfer belt 2. Further, the rotation of the cam 53 causes the cam follower 54 to rotate and one end of the rotator 49 opposite to another end of the rotator 49 at which the primary transfer roller 7K is disposed is pressed.

Accordingly, the rotator 49 rotates counterclockwise in FIG. 20 against the biasing force of the spring, and the primary transfer roller 7K moves away from the intermediate transfer belt 2. As described above, the primary transfer roller 7K of the most-upstream primary transfer section 201 and the primary transfer rollers 7C, 7M, and 7Y of the central primary transfer section 202 independently contact with or separate from the intermediate transfer belt 2.

Next, a toner supply device that supplies toner to corresponding one of the developing devices 6Y, 6M, 6C, 6K, and 6T is described with reference to FIGS. 21, 22, and 23.

Figure 21:
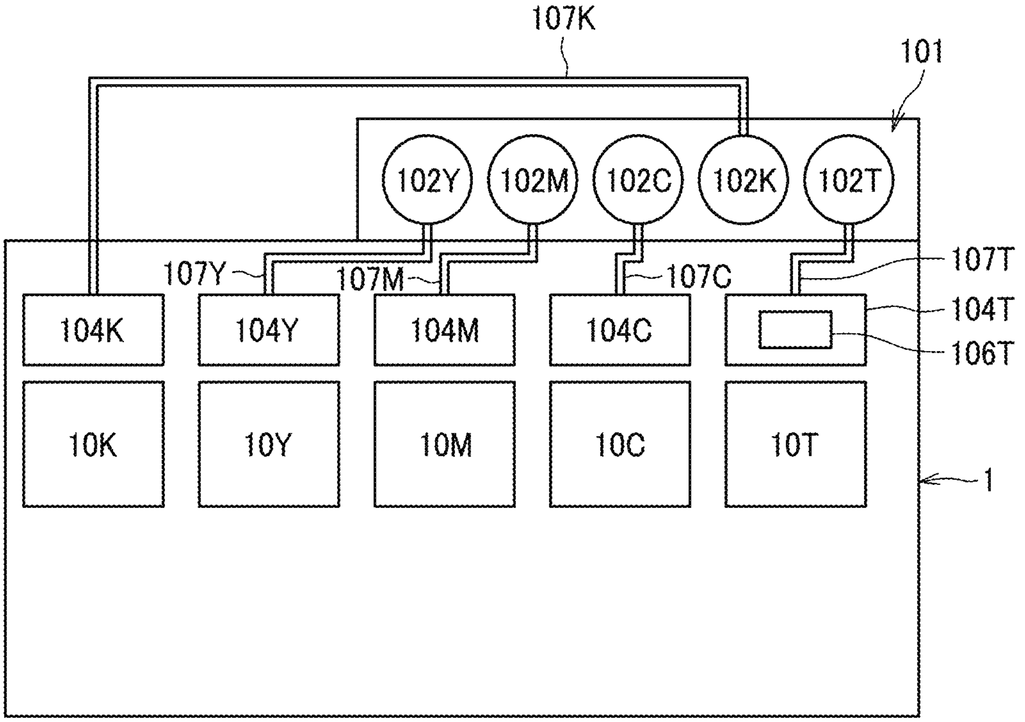
FIG. 21 is a diagram illustrating an arrangement of image forming devices, pre-supply reservoirs, and toner bottles in the case in which a toner bottle of a special color is arranged in a most-downstream primary transfer section, according to an embodiment of the present disclosure.

As illustrated in FIG. 21, the image forming apparatus 1 includes a bottle container 101 in an upper portion of the housing of the image forming apparatus 1. Toner bottles 102Y, 102M, 102C, 102K, and 102T that contain yellow (Y) toner, magenta (M) toner, cyan (C) toner, black (K) toner, and special color toner, respectively, to be supplied are attached to the bottle container 101.

Bottle drivers 103Y, 103M, 103C, 103K, and 103T (see FIG. 23) of the toner supply devices are fixed to the bottle container 101. The bottle drivers 103Y, 103M, 103C, 103K, and 1031 detachably holds the toner bottles 102Y, 102M, 102C, 102K, and 102T, respectively.

Figure 23:
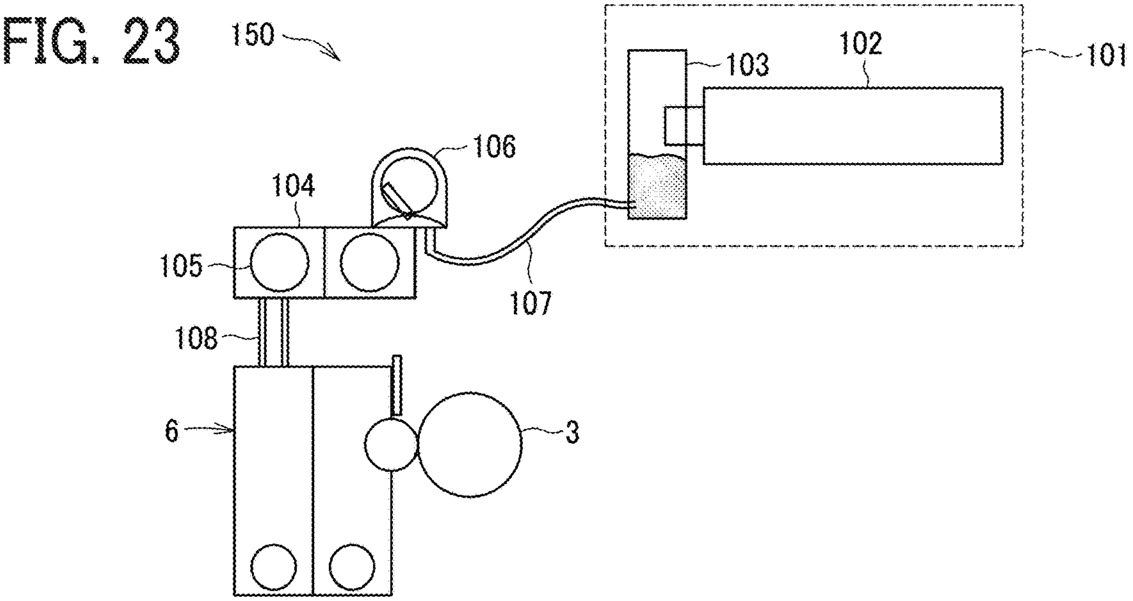
FIG. 23 is a schematic diagram illustrating a configuration of a toner supply device according to an embodiment of the present disclosure.

FIG. 23 is a schematic diagram illustrating a toner bottle 102, a toner supply device 150, a developing device 6, and a photoconductor 3 for one of the colors T, Y, M, C, or K. In FIG. 23, the suffixes T, Y, M, C, and K attached to the reference numerals are omitted for the sake of convenience.

The toner supply device 150 includes a bottle driver 103, a pre-supply reservoir 104, to a toner supply unit 105, a suction pump 106, and a transfer tube 107. The pre-supply reservoir 104 is disposed directly above the developing device 6. The transfer tube 107 includes one end connected to the bottle driver 103 and the other end connected to the suction pump 106 to form a toner conveyance path to transfer toner from the bottle driver 103 to the pre-supply reservoir 104. In the present embodiment, the transfer tube 107 is a flexible tube. When the bottle driver 103 drives the toner bottle 102 to rotate, toner contained in the toner bottle

102 is transferred from a head opening of the toner bottle 102 to the bottle driver 103. Suction operation of the suction pump 106 causes toner in the bottle driver 103 to be transferred to the suction pump 106 via the transfer tube 107. At the same time, the toner sucked from the bottle driver 103 is dropped into the pre-supply reservoir 104 from a discharge port of the suction pump 106.

Rotation of the toner supply unit 105 causes the toner stored in the pre-supply reservoir 104 to be supplied to the developing device 6 via a toner supply path 108. As described above, in the present embodiment, the toner transferred from the bottle driver 103 to the vicinity of the developing device 6 by the suction pump 106 is temporarily stored in the pre-supply reservoir 104.

Note that, for example, in the case in which a white toner is employed as a special color to form a white background in an image, a white toner layer is formed at a lowermost layer of the image. For this reason, the most-downstream primary transfer section 203 is arranged most downstream among the most-upstream primary transfer section 201, the central primary transfer section 202, and the most-downstream primary transfer section 203. Alternatively, when a transparent toner image is transferred to apply glossiness to an image, the transparent toner image is formed on the surface of the image. For this reason, in this case, the most-downstream primary transfer section 203 is arranged most upstream among the most-upstream primary transfer section 201, the central primary transfer section 202, and the most-downstream primary transfer section 203.

Figure 22:
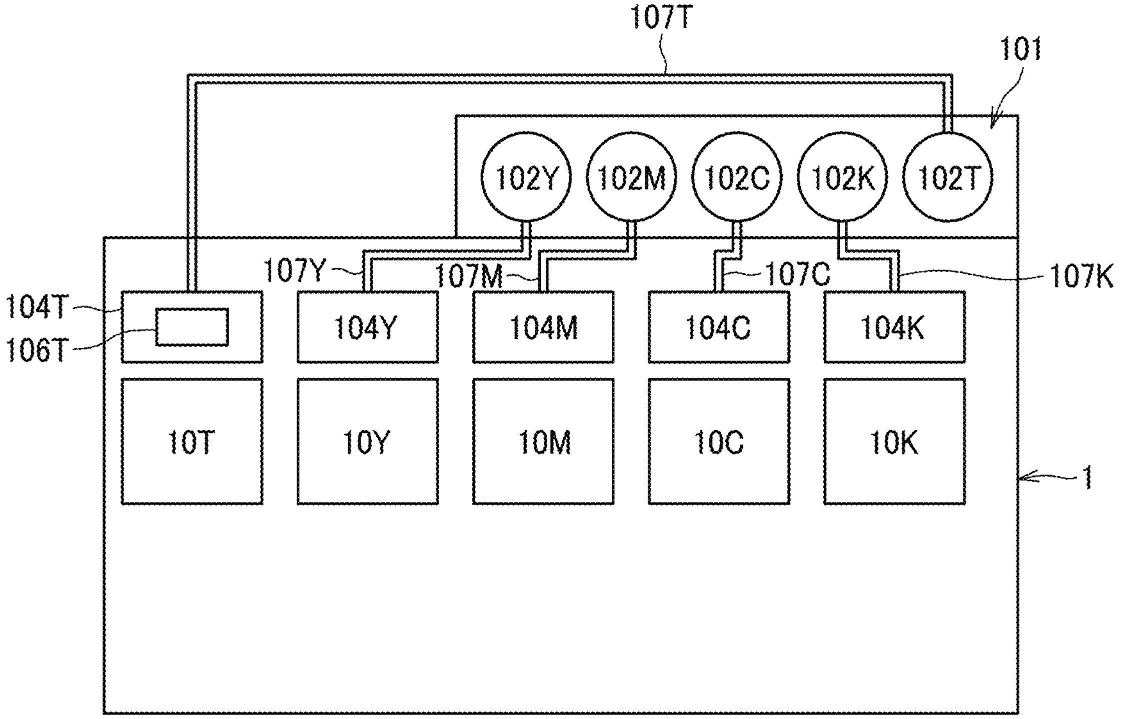
FIG. 22 is a diagram illustrating an arrangement of the image forming devices, the pre-supply reservoirs, and the toner bottles of FIG. 21 in the case in which a toner bottle for black toner is arranged in a most-downstream primary transfer section, according to an embodiment of the present disclosure.

As described above, in order to Change the order in which the toner of the special color is primarily transferred in accordance with the type of the special color to be employed, in the present embodiment, the toner supplied to the most-upstream primary transfer section 201 and the most-downstream primary transfer section 203 can be changed as illustrated in FIGS. 21 and 22.

Specifically, in FIG. 21, the special color toner bottle 102T is connected to a pre-supply reservoir 104T disposed most downstream on the right side of FIG. 21, and the black (K) toner bottle 102K is connected to a pre-supply reservoir 104K disposed most upstream in FIG. 21. In FIG. 22, the black (K) toner bottle 102K is connected to the pre-supply reservoir 104K disposed most-downstream on the right side of the FIG. 22, and the special color toner bottle 102T is connected to the pre-supply reservoir 104T disposed most upstream in the rotation direction of the intermediate transfer belt 2.

In addition, in FIGS. 21 and 22, the arrangement of the toner bottles 102K and 102T and the transfer tubes 107K and 107T connected to the toner bottles 102K and 102T, respectively, are not changed, and destinations to which the transfer tubes 107K and 107T are connected are changed. In other words, in FIG. 21, the transfer tube 107K is extended and connected to the suction pump 106T disposed most upstream. On the other hand, in FIG. 22, the transfer tube 107T is connected to the suction pump 106T disposed most downstream in the rotation direction of the intermediate transfer belt 2.

In contrast to the transfer tube 107T, the transfer tube 107T is significantly stretched toward upstream in FIG. 22. Accordingly, positions at which the black (K) toner and the special color toner are primarily transferred can be changed only by changing positions of the pre-supply reservoirs 104K, 104Y, 104M, 104C, and 104T and the image forming devices 10Y, 10M, 10C, and 10T without replacing the toner bottles 102K, 102Y 102M, 102C, and 102T or the bottle drivers 103Y, 103M, 103C, 103K, and 103T. Accordingly, the labor for replacing the toner bottles 102K, 102Y, 102M, 102C, and 102T or the bottle drivers 103Y, 103M, 103C, 103K, and 103T can be reduced.

Note that the actual length of the transfer tube 107T in FIG. 21 and the transfer tube 107K in FIG. 22 is longer than the length of the transfer tube 107T in FIG. 21 and the transfer tube 107K illustrated in FIG. 22, respectively, and a space in which extra tubes of the transfer tube 107T and the transfer tube 107K can be accommodated is disposed in the image forming apparatus 1.

Next, operation of changing the colors of toner transferred by the most-upstream primary transfer section 201, the central primary transfer section 202, and the most-downstream primary transfer section 203 is described with reference to the flowchart of FIG. 24.

Figure 24:
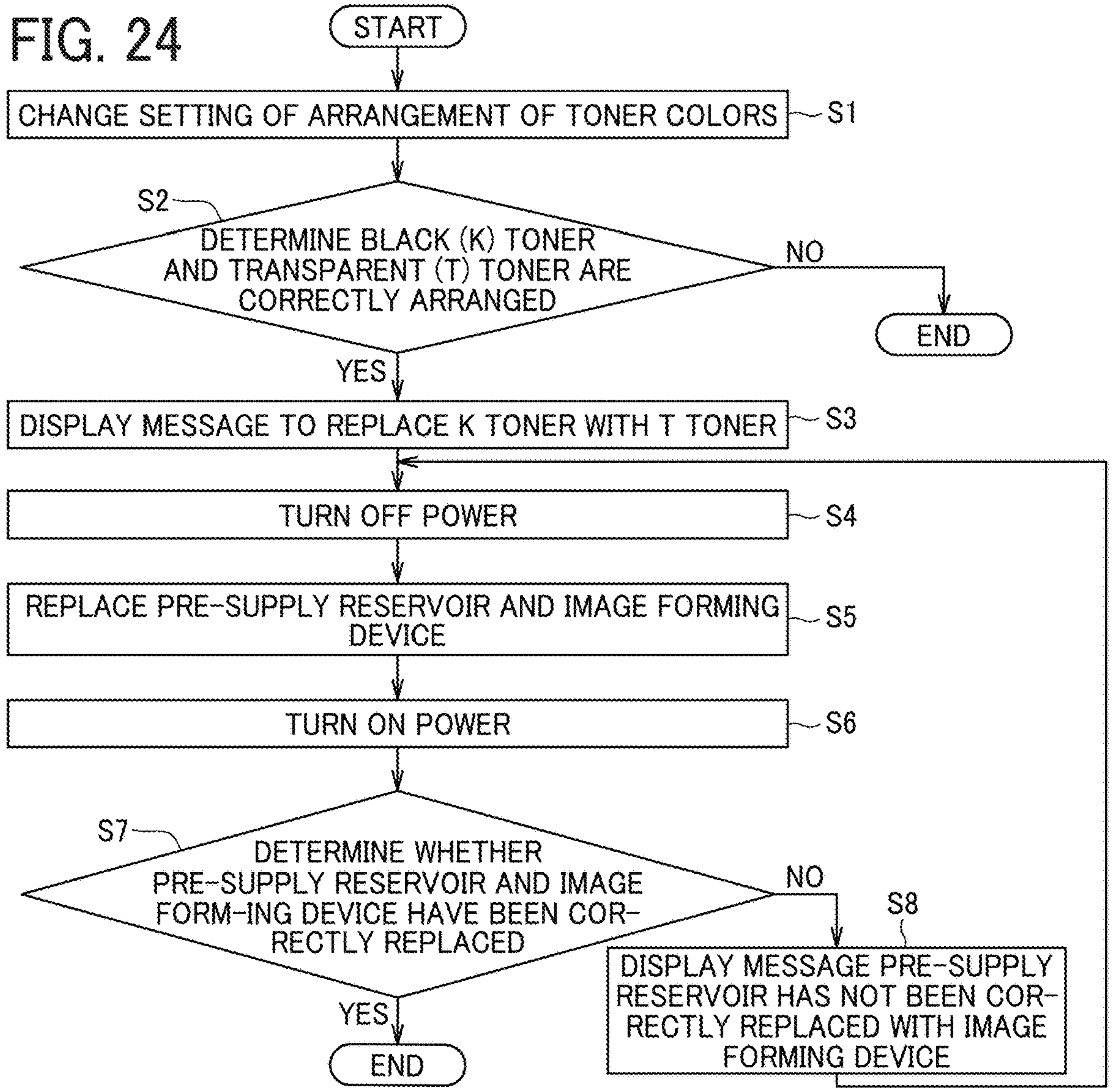
FIG. 24 is a flowchart of a process for checking arrangement of image forming devices, pre-supply reservoirs, and toner bottles, according to an embodiment of the present disclosure.

As illustrated in FIG. 24, first, setting of the arrangement of colors of toner is changed (step S1). Specifically, the black (K) toner is arranged in the most-upstream primary transfer section 201 and the special color toner is arranged in the most-downstream primary transfer section 203. Alternatively, the special color toner is arranged in the most-upstream primary transfer section 201 and the black (K) toner is arranged in the most-downstream primary transfer section 203.

Then, the controller 300 of the image forming apparatus 1 determines whether the colors of toner are correctly arranged. When the colors of toner are not correctly arranged, the controller 300 causes an operation display unit to display a message prompting to replace the black (K) toner with the special color toner (steps S2 and S3). Then, the power supply of the image forming apparatus 1 is turned off. The pre-supply reservoir 104K is replaced with the pre-supply reservoir 104T and the image forming device 10K is replaced with image forming device 10T. Then, the power supply of the image forming apparatus 1 is turned on again (steps S4, S5, and S6). Subsequently, the controller 300 of the image forming apparatus 1 determines again whether the pre-supply reservoir 104K has been replaced with the pre-supply reservoir 104T and the image forming device 10K have been replaced with image forming device 10T (step S7). If the replacement has not been performed, the message to replace the black (K) toner with the special color toner is displayed again on the operation display unit (step S8).

In steps S2 and S7, the controller 300 determines whether the black (K) toner and the special color toner are correctly arranged, and the controller 300 also determines whether a correct color such as the transparent color or the white color is set as the special color.

Before the setting of the image forming apparatus 1 is changed, the power supply of the image forming apparatus 1 may be turned off as in step S4 and the arrangement of the toner colors may be changed as in step S5.

Figure 25:
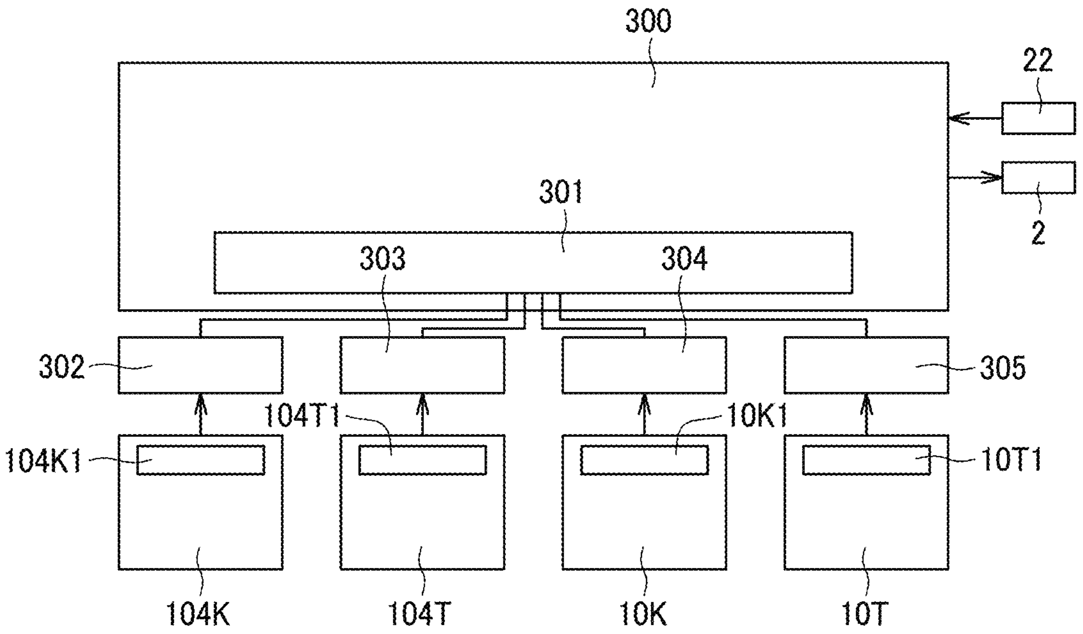
FIG. 25 is a schematic diagram illustrating a configuration of a controller disposed in the image forming apparatus, according to an embodiment of the present disclosure.

As illustrated in FIG. 25, the controller 300 provided for the image forming apparatus 1 determines whether the black (K) toner and the special color toner are correctly arranged in step S1 and step S6. The controller 300 includes a determination circuit 301 that determines whether the pre-supply reservoirs 104K, 104Y, 104M, 104C, and 104T and the image forming devices 10K, 10C, 10M, 10Y, and 10T are properly arranged.

The determination circuit 301 includes a first connector 302, a second connector 303, a third connector 304, and a fourth connector 305. The first connector 302 is connected to the pre-supply reservoir 104K disposed most upstream. The second connector 303 is connected to the pre-supply reservoir 104T disposed most downstream. The third connector 304 is connected to the image forming device 10K disposed most upstream. The fourth connector 305 is connected to the image forming device 10T disposed most downstream.

The pre-supply reservoir 104K includes a circuit board 104K1 connected to the first connector 302, and the pre-supply reservoir 104T includes a circuit board 104T1 connected to the second connector 303. A circuit board 10K1 connected to the third connector 304 is disposed in, for example, a development container of the developing device 6K of the image forming device 10K, and a circuit board 10T1 connected to the fourth connector 305 is disposed in, for example, a development container of the developing device 6T of the image forming device 10T.

The first connector 302, the second connector 303, the third connector 304, and the fourth connector 305 each include multiple switches. The determination circuit 301 can determine whether the black (K) toner or the special color toner is arranged and which special color toner is arranged if the special color toner is arranged, based on a combination of ON and OFF of the switches when the circuit board 104K1, the circuit board 104T1, the circuit board 10K1, and the circuit board 10T1 are connected to the first connector 302, the second connector 303, the third connector 304, and the fourth connector 305, respectively. In the case in which the controller 300 determines only whether the black (K) toner or the special color is arranged without determining which special color toner is arranged, the determination may be made based on whether the feeler 27*a* and the photosensor 28 are turned on or off.

Further, the controller 300 receives a detection result of the sensor 22. The controller 300 changes the rotation speed of the intermediate transfer belt 2 based on the detection result.

Next, the transfer device 20 according to a modification of the above-described embodiments is described with reference to FIGS. 26, 27A, and 27B. FIG. 27A is a diagram illustrating the second contact-and-separation mechanism 92 in which the primary transfer rollers 7C, 7M, and 7Y are arranged at the contact positions to contact the intermediate transfer belt 2, according to the modification. FIG. 27B is a diagram illustrating the second contact-and-separation mechanism 92 in which the primary transfer rollers 7C, 7M, and 7Y are arranged at the separation positions separated from the intermediate transfer belt 2, according to the modification.

Figure 26:
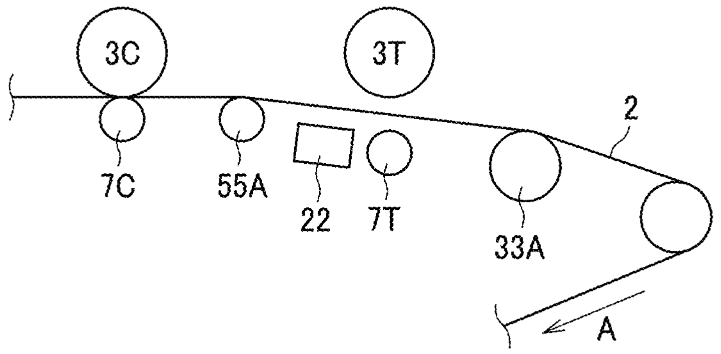
FIG. 26 is a diagram illustrating an arrangement of driven rollers and a sensor, according to an embodiment different from the embodiment of FIG. 5.
Figure 27A:
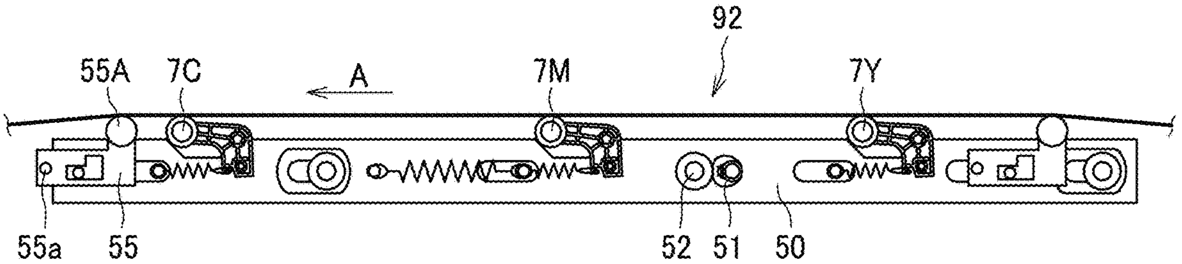
FIGS. 27A and 27B are side views of a configuration in which primary transfer rollers of a central primary transfer section contact with or separate from an intermediate transfer belt, according to a modification of the embodiment of FIG. 5.
Figure 27B:
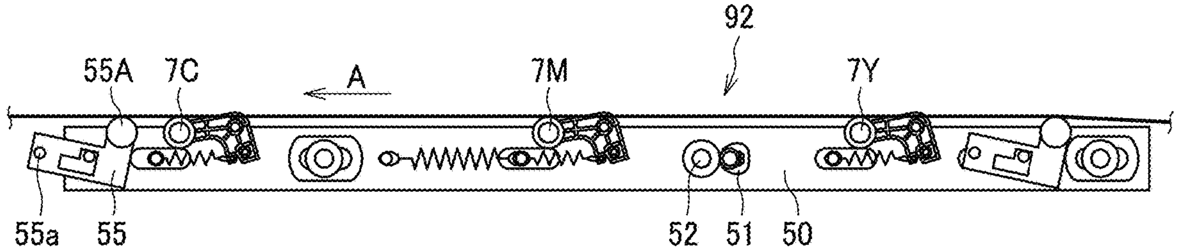

As illustrated in FIG. 26, in the present modification, a driven roller 55A that stretches the intermediate transfer belt 2 is disposed between the primary transfer roller 7T disposed in the most-downstream primary transfer section 203 and the primary transfer roller 7C upstream from the primary transfer roller 7T in the rotation direction of the intermediate transfer belt 2. The driven roller 55A is disposed upstream from the sensor 22 in the rotation direction of the intermediate transfer belt 2. As illustrated in FIG. 27A, the driven roller 55A is disposed at one end of the rotator 55. The rotator 55 is rotatable about a rotation fulcrum disposed at an end of the rotator 55 opposite to another end of the rotator 55 at which the driven roller 55A is disposed.

The second contact-and-separation mechanism 92 includes the cam 51. The rotation fulcrum 55*a* is fixed to the front slider 50 that brings the primary transfer rollers 7C, 7M, and 7Y of the central primary transfer section 202 into contact with and separate from the intermediate transfer belt 2. When the cam 51 rotates to move the front slider 50 to the right in FIG. 27A, the rotator 55 is rotated clockwise about the rotation fulcrum 55*a* as illustrated in FIG. 27B.

In the above-described embodiment, the driven roller 55A contacts the intermediate transfer belt 2 when the primary transfer rollers 7Y, 7M, and 7C of the central primary transfer section 202 are positioned at the contact positions to stretch the intermediate transfer belt 2. In the above-described mode E in which the primary transfer roller 7T of the most-downstream primary transfer section 203 is arranged at the large separation position and the primary transfer rollers 7Y 7M, and 7C of the central primary transfer section 202 are arranged at the contact positions, the primary transfer roller 7T of the most-downstream primary transfer section 203 is separated from the photoconductor 3. Accordingly, the nip pressure of the transfer nips of primary transfer roller 7Y, 7M, and 7C of the central primary transfer section 202 is likely to be small.

In the present modification, the driven roller 55A disposed between the primary transfer roller 7T of the most-downstream primary transfer section 203 and the primary transfer roller 7C disposed immediately upstream from the primary transfer roller 7T contacts the intermediate transfer belt 2 when the primary transfer rollers 7Y, 7M, and 7C of the central primary transfer section 202 are arranged at the respective contact positions. By so doing, transfer pressure of the transfer nips of the primary transfer rollers 7Y 7M, and 7C of the central primary transfer section 202 can be prevented from being decreased.

In addition, the sensor 22 is disposed between the driven roller 55A and the primary transfer roller 7T. By so doing, the traveling speed of the intermediate transfer belt 2 can be detected in a state in which there is no influence of the vibration of the driven roller 55A to the intermediate transfer belt 2. Thus, the accuracy of the traveling speed of the intermediate transfer belt 2 in the most-downstream primary transfer section 203 can be particularly enhanced.

Figure 28A:
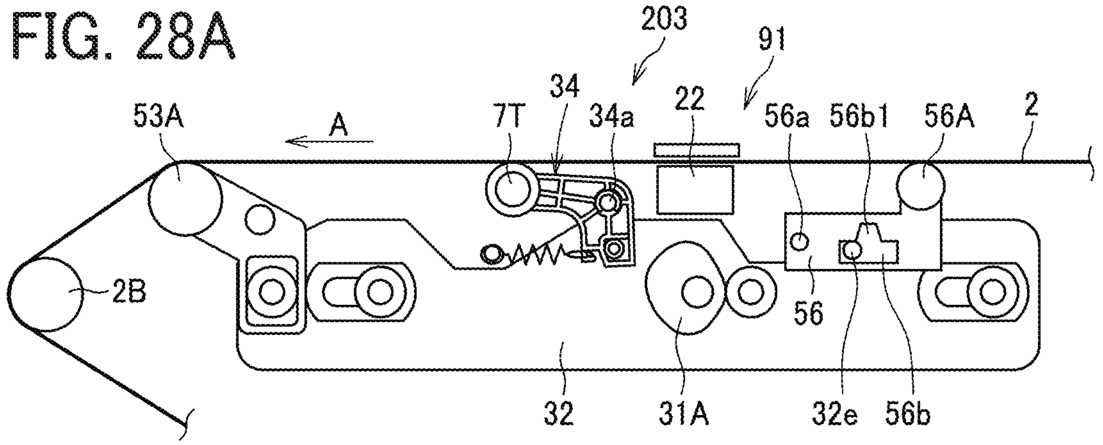
FIGS. 28A, 28B, and 28C are plan views of a configuration in which a primary transfer roller of a most-downstream primary transfer section according to a modification of the embodiment of FIG. 5 different from the modification of FIGS. 27A and 27B.
Figure 28B:
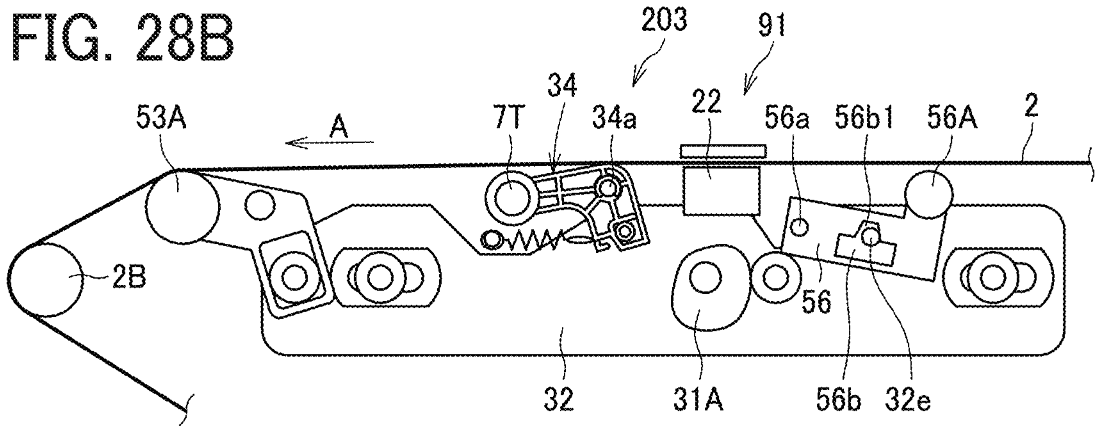
Figure 28C:
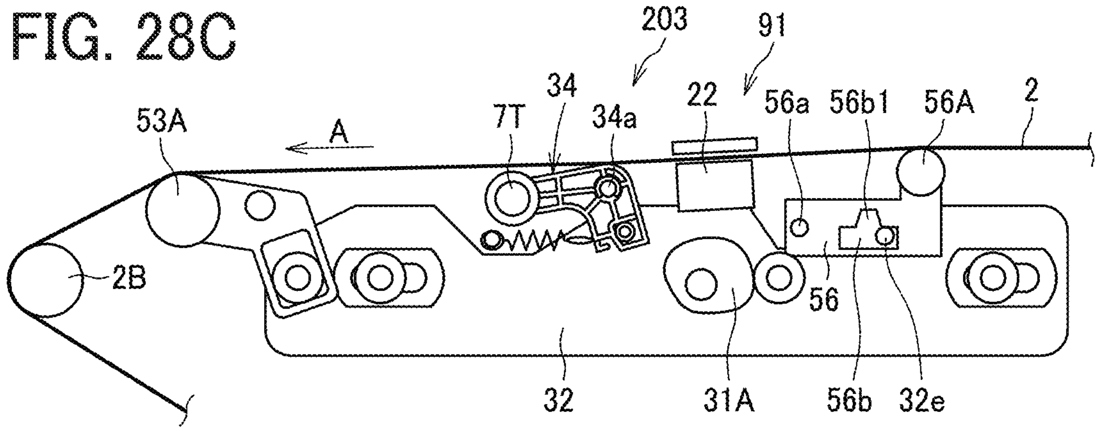

Next, another embodiment of the present disclosure is described with reference to FIGS. 28A, 28B, and 28C. In the present embodiment, the driven roller 56A disposed between the primary transfer roller 7T of the most-downstream primary transfer section 203 and the primary transfer roller 7C immediately upstream from the primary transfer roller 7T is moved by the first contact-and-separation mechanism 91 that causes the primary transfer roller 7T of the most-downstream primary transfer section 203 to contact with or separate from the intermediate transfer belt 2. FIG. 28A is a diagram illustrating the first contact-and-separation mechanism 91 in a case in which the primary transfer roller 7T is arranged at the contact position, according to the present embodiment. FIG. 28B is a diagram illustrating the first contact-and-separation mechanism 91 in a case in which the primary transfer roller 7T is arranged at the small separation position, according to the present embodiment. FIG. 28C a diagram illustrating the first contact-and-separation mechanism 91 in a case in which the primary transfer roller 7T is arranged at the large separation position, according to the present embodiment.

As illustrated in FIG. 28A, a rotator 56 is rotatable about a rotation fulcrum 56*a* disposed at an end of the rotator 56 opposite to another end of the rotator 56 at which the driven roller 56A is disposed. The rotation fulcrum 56*a* is fixed to the front slider 32 that causes the primary transfer roller 7T of the most-downstream primary transfer section 203 to contact with or separate from the intermediate transfer belt 2. A mechanism that causes the sensor 22 to contact with or separate from the intermediate transfer belt 2 is similar to the mechanism employed in the above-described embodiment.

A hole 56*b* is disposed in the rotator 56. A pin 32*e* of the front slider 32 is inserted into the hole 56*b*. The hole 56*b* has the same height at both ends of the hole 56*b* in the horizontal direction in FIGS. 28A, 28B, and 28C, i.e., a direction in which the front slider 32 moves. The height is a height of the hole 56*b* in the vertical direction in FIGS. 28A, 28B, and 28C and height of the hole 56*b* in a direction in which the hole 56*b* contacts with or moves away from the intermediate transfer belt 2. In addition, the hole 56*b* has a shape such that the hole 56*b* includes a convex portion 56*b*1 protruding toward the intermediate transfer belt 2 at the center of the hole 56*b* in the horizontal direction in FIGS. 28A, 28B, and 28C, i.e., the direction in which the front slider 32 moves.

The driven roller 56A has the above-described shape. Accordingly, the driven roller 56A can be separated from the intermediate transfer belt 2 only when the primary transfer roller 7T of the most-downstream primary transfer section 203 is arranged at the small separation position, and the driven roller 56A can be brought into contact with the intermediate transfer belt 2 when the primary transfer roller 7T of the most-downstream primary transfer section 203 is arranged at the large separation position.

In other words, when the primary transfer roller 7T of the most-downstream primary transfer section 203 in FIG. 28B is arranged at the small separation position, the pin 32*e* of the front slider 32 is accommodated in the convex portion 56*b*1 of the hole 56*b*. Accordingly, the rotator 56 rotates clockwise in FIG. 28B. Accordingly, the driven roller 56A moves away from the intermediate transfer belt 2.

On the other hand, when the primary transfer roller 7T of the most-downstream primary transfer section 203 in FIG. 28B is arranged at the large separation position, the pin 32*e* moves toward a right end of the hole 56*b*, Accordingly, the rotator 56 rotates counterclockwise, and the driven roller 56A contacts the intermediate transfer belt 2.

Also in the present embodiment, the driven roller 56A can contact the intermediate transfer belt 2 when the primary transfer rollers 7Y, 7M, and 7C of the central primary transfer section 202 are arranged at the contact positions and the primary transfer roller 7T of the most-downstream primary transfer section 203 is arranged at the large separation position.

As a result, the transfer pressure of the transfer nips of the primary transfer rollers 7Y, 7M, and 7C of the central primary transfer section 202 can be prevented from being decreased. Further, due to the shape of the hole 56*b* described above, the driven roller 56A can be separated from the intermediate transfer belt 2 only-when the primary transfer roller 7T of the most-downstream primary transfer section 203 is arranged at the small separation position.

Embodiments of the present disclosure are not limited to the embodiments and modification described above, and various modifications and enhancements are possible without departing from the gist of the present disclosure.

Examples of the recording sheet include, in addition to the sheet P (plain paper), thick paper, a postcard, an envelope, thin paper, coated paper such as coated paper or art paper, tracing paper, an overhead projector (OHP) sheet, a plastic film, prepreg, and copper foil.

In the above-described embodiments of the present disclosure, the primary transferors of all the transfer sections disposed in the transfer device are movable in directions in which the primary transferors contact with or separate from the latent image bearer. However, the embodiments of the present disclosure are not limited to such a configuration. In other words, the primary transfer rollers 7Y, 7M, and 7C of the central primary transfer section 202 may not be moved.

In the above-described embodiments of the present disclosure, the primary transfer roller 7T and the driven rollers 33A and 21A of the most-downstream primary transfer section 203 are moved by the driving force of the common driving source. In some embodiments, each of the primary transfer roller 7T and the driven rollers 33A and 21A of the most-downstream primary transfer section 203 may be moved by the driving force of a different driving source.

In the above-described embodiments of the present disclosure, the distance between the primary transfer roller 7T, which is the primary transferor most downstream in the rotation direction of the intermediate transfer belt 2, and the photoconductor 3T is greater at the large separation position than at the small separation position. However, the primary transfer roller 7T may not be moved when the primary transfer roller 7T is arranged at the small separation position and the large separation position.

In the above description, configurations of the transferor in which the primary transfer rollers of all the primary transfer sections contact with and separate from the corresponding photoconductors have been described. However, at least the primary transfer rollers of the most-downstream primary transfer section and the most-upstream primary transfer section may contact with or separate from the corresponding photoconductors.

Aspects of the present disclosure are, for example, as follows.

First Aspect

In a first aspect of the present disclosure, a transfer device includes an intermediate transferor to rotate, multiple primary transferors to contact the intermediate transferor, multiple primary transfer sections, and multiple latent image bearers. The multiple primary transfer sections each has a primary transfer nip between the primary transferor and the latent image bearer with the intermediate transferor interposed between the primary transferor and the latent image bearer.

The multiple primary transfer sections include a most-upstream primary transfer section most upstream in a rotation direction of the intermediate transferor and a most-downstream primary transfer section most downstream in the rotation direction. The most-upstream primary transfer section and the most-downstream primary transfer section are switchable to transfer developer of a special color other than any of yellow, magenta, cyan, and black color.

The primary transferor of the most-upstream primary transfer section and the primary transferor of the most-downstream primary transfer section are disposed to be switchable between a contact position at which the primary transferor contacts the latent image bearer with the intermediate transferor interposed between the primary transferor and the latent image bearer and a separation position at which the primary transferor is separated from the latent image bearer.

Only the primary transfer section that transfers the developer of the special color is arranged at the separation position. Each of the other primary transfer sections is arranged at the contact position to transfer an image.

Second Aspect

In the transfer device according to the first aspect, the most-upstream primary transfer section or the most-downstream primary transfer section transfers a developer image of black color.

Third Aspect

In the transfer device according to the first or second aspect, the developer transferred in the most-upstream primary transfer section and the developer transferred in the most-downstream primary transfer section are exchangeable with each other.

Fourth Aspect

In the transfer device according to any one of the first to third aspects, the primary transfer section to transfer the developer of the special color is arranged at the separation position and each of at least four other primary transfer sections of the multiple primary transfer sections are arranged at the contact position to transfer an image.

Fifth Aspect

The transfer device according to any one of the first to fourth aspects further includes a sensor between the most-downstream primary transfer section and the primary transfer section immediately upstream from the most-downstream primary transfer section to detect a rotation speed of the intermediate transferor.

Sixth Aspect

The transfer device according to any one of the first to fifth aspects further includes a first tension roller to stretch the intermediate transferor, and a first movement mechanism to cause a single driving source to move the primary transferor of the most-downstream primary transfer section to the contact position and the separation position and move the first tension roller to a first position, a second position, and a third position.

Seventh Aspect

In the transfer device according to any one of the first to sixth aspects, the first tension roller is disposed downstream from the primary transferor of the most-downstream primary transfer section in the rotation direction of the intermediate transferor and stretches the intermediate transferor at all of the first position, the second position, and the third position of the first tension roller moved by the first movement mechanism.

Eighth Aspect

The transfer device according to any one of the first to seventh aspects further includes a second tension roller between the most-downstream primary transfer section and the primary transfer section immediately upstream from the most-downstream primary transfer section in the rotation direction of the intermediate transferor to stretch the intermediate transferor.

The second tension roller stretches the intermediate transferor in a state in which the primary transferor of the most-downstream primary transfer section is separated from the latent image bearer and the primary transfer section immediately upstream from the most-downstream primary transfer section in the rotation direction of the intermediate transferor contacts the latent image bearer.

Ninth Aspect

The transfer device according to the eighth aspect further includes a sensor between the most-downstream primary transfer section and the second tension roller to detect a rotation speed of the intermediate transferor.

Tenth Aspect

The transfer device according to the eighth or ninth aspect further includes a second movement mechanism to cause the primary transferor of the central primary transfer section immediately upstream from the most-downstream primary transfer section to contact with and separate from the intermediate transferor. The second movement mechanism causes the second tension roller to move in directions in which the second tension roller contacts with and separates from the intermediate transferor.

Eleventh Aspect

In the transfer device according to the eighth or ninth aspect, the first movement mechanism causes the second tension roller to move in directions in which the second tension roller contacts with and separates from the intermediate transferor.

Twelfth Aspect

In the transfer device according to any one of the second to fourth aspects and the sixth to eleventh aspects, the rotation speed of the intermediate transferor is changed based on a detection result by the sensor.

Thirteenth Aspect

An image forming apparatus includes the transfer device according to any one of the first to twelfth aspects and the multiple latent image bearers.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A transfer device comprising:

an intermediate transferor to rotate; and a plurality of primary transfer sections each including:

a primary transferor to contact the intermediate transferor; and a primary transfer nip between the primary transferor and a latent image bearer with the intermediate transferor interposed between the primary transferor and the latent image bearer, the plurality of primary transfer sections including the primary transferor at at least five positions, the plurality of primary transfer sections including:

a most-upstream primary transfer section most upstream among the plurality of primary transfer sections in a rotation direction of the intermediate transferor; and a most-downstream primary transfer section most downstream among the plurality of primary transfer sections in the rotation direction, wherein the transfer device is configured to transfer an image in at least three modes:

only a primary transferor of the most-upstream primary transfer section is at a separation position; only a primary transferor of the most-downstream primary transfer section is at a separation position; and only the primary transferor of the most-upstream primary transfer section is at a contact position;

wherein the transfer device further comprises a first contact-and-separation structure to cause the primary transferor of the most-downstream primary transfer section to contact with or separate from the intermediate transferor;

the primary transferor of the most-downstream primary transfer section is switchable among a contact position at which the primary transferor contacts the latent image bearer with the intermediate transferor interposed between the primary transferor and the latent image bearer, a small separation position at which the primary transferor is separated from the latent image bearer by a small separation distance, and a large separation position at which the primary transferor is separated from the latent image bearer by a large separation distance;

wherein the transfer device further comprises a movement structure to cause a single driving source to:

move the primary transferor of the most-downstream primary transfer section to the contact position, the small separation position, and the large separation position; and move a tension roller to a first position, a second position, and a third position;

wherein the transfer device further comprises another tension roller between the primary transferor of the most-downstream primary transfer section and the primary transferor immediately upstream from the primary transferor of the most-downstream primary transfer section to stretch the intermediate transferor, wherein said another tension roller stretches the intermediate transferor in a state in which the primary transferor of the most-downstream primary transfer section is separated from the latent image bearer and the primary transferor immediately upstream from the primary transferor of the most-downstream primary transfer section contacts the latent image bearer; and wherein the transfer device further comprises another movement structure to cause the primary transferor of a central primary transfer section of the plurality of primary transfer sections immediately upstream from the primary transferor of the most-downstream primary transfer section to contact with and separate from the intermediate transferor, wherein said another movement structure causes said another tension roller to move in directions in which said another tension roller contacts with and separates from the intermediate transferor.

2. The transfer device according to claim 1, wherein one of the most-upstream primary transfer section and the most-downstream primary transfer section is a special-color primary transfer section to transfer developer of a special color other than any of yellow, magenta, cyan, and black colors, and the special-color primary transfer section is switchable between the most-upstream primary transfer section and the most-downstream primary transfer section.

3. The transfer device according to claim 2, wherein the primary transferor of the other of the most-upstream primary transfer section and the most-downstream primary transfer section transfers a developer image of black color.

4. The transfer device according to claim 1, wherein the developer transferred in the most-upstream primary transfer section and the developer transferred in the most-downstream primary transfer section are switchable with each other.

5. The transfer device according to claim 1, further comprising a sensor between the primary transferor of the most-downstream primary transfer section and the primary transferor immediately upstream from the primary transferor of the most-downstream primary transfer section in the rotation direction of the intermediate transferor, to detect a rotation speed of the intermediate transferor.

6. The transfer device according to claim 5, wherein the rotation speed of the intermediate transferor is changed based on a detection result by the sensor.

7. The transfer device according to claim 1, wherein the tension roller is disposed downstream from the primary transferor of the most-downstream primary transfer section in the rotation direction of the intermediate transferor and stretches the intermediate transferor.

8. The transfer device according to claim 1, further comprising a sensor between the primary transferor of the most-downstream primary transfer section and said another tension roller to detect a rotation speed of the intermediate transferor.

9. The transfer device according to claim 1, wherein the movement structure causes said another tension roller to move in directions in which said another tension roller contacts with and separates from the intermediate transferor.

10. An image forming apparatus comprising:

the transfer device according to claim 1; and a plurality of latent image bearers including the latent image bearer.

11. The transfer device according to claim 1, wherein the first contact-and-separation structure comprises a cam and a rotation shaft, the cam is rotatable about the rotation shaft, and the cam has a small-diameter portion, a medium-diameter portion, and a large-diameter portion each having a different diameter by 120 degrees.

* * * * *